US011419114B2

(12) United States Patent
Zhang et al.

(10) Patent No.: US 11,419,114 B2
(45) Date of Patent: Aug. 16, 2022

(54) INFORMATION SENDING METHOD AND APPARATUS, TERMINAL, ACCESS NETWORK DEVICE AND SYSTEM

(71) Applicant: GUANGDONG OPPO MOBILE TELECOMMUNICATIONS CORP., LTD., Guangdong (CN)

(72) Inventors: Zhi Zhang, Dongguan (CN); Hai Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 376 days.

(21) Appl. No.: 16/496,922

(22) PCT Filed: Mar. 24, 2017

(86) PCT No.: PCT/CN2017/078063
§ 371 (c)(1),
(2) Date: Sep. 23, 2019

(87) PCT Pub. No.: WO2018/170877
PCT Pub. Date: Sep. 27, 2018

(65) Prior Publication Data
US 2020/0128541 A1    Apr. 23, 2020

(51) Int. Cl.
*H04W 72/04* (2009.01)
*H04W 76/27* (2018.01)
*H04W 80/02* (2009.01)

(52) U.S. Cl.
CPC ..... *H04W 72/0453* (2013.01); *H04W 72/042* (2013.01); *H04W 76/27* (2018.02); *H04W 80/02* (2013.01)

(58) Field of Classification Search
CPC ............. H04W 72/0453; H04W 76/27; H04W 72/042; H04W 80/02
See application file for complete search history.

(56) References Cited

U.S. PATENT DOCUMENTS

2009/0318183 A1*  12/2009  Hugl ............... H04W 52/42
                                                    455/522
2013/0070703 A1    3/2013  Yasukawa
(Continued)

FOREIGN PATENT DOCUMENTS

CN      101800583 A     8/2010
CN      104770037       7/2015
(Continued)

OTHER PUBLICATIONS

First Office Action of the Chinese application No. 201780087949.1, dated Jun. 15, 2020.
(Continued)

Primary Examiner — Ajay Cattungal
(74) Attorney, Agent, or Firm — Ladas & Parry, LLP

(57) ABSTRACT

Provided are an information sending method and apparatus, a terminal, an access network device and a system, which relate to the field of communications. The method comprises: an access network device determines a first frequency domain resource pattern among K frequency domain resource patterns, each frequency domain resource pattern corresponding to at least one frequency domain resource; the access network device sends downlink control information to a terminal, the downlink control information being used for indicating an index of the first frequency domain resource pattern, the frequency domain resource corresponding to the first frequency domain resource pattern being used for transmitting service data of the terminal. The K frequency domain resource patterns are provided in advance, and when it is necessary for the access network device to allocate the one or more resources corresponding to the frequency domain resource pattern to the terminal, the downlink control information requires only a very few bits to indicate the index of the first frequency domain resource pattern, thereby enabling the size of the downlink control (Continued)

information to be relatively small, increasing the transmission reliability and transmission efficiency of the downlink control information, and reducing the number of retransmissions.

13 Claims, 10 Drawing Sheets

(56) References Cited

U.S. PATENT DOCUMENTS

| | | | | |
|---|---|---|---|---|
| 2013/0188566 | A1* | 7/2013 | Zhu | H04M 1/2535 |
| | | | | 370/329 |
| 2014/0211747 | A1* | 7/2014 | Takeda | H04L 1/1861 |
| | | | | 370/329 |
| 2015/0215906 | A1* | 7/2015 | Park | H04L 5/0053 |
| | | | | 370/312 |
| 2015/0223208 | A1* | 8/2015 | Park | H04W 4/06 |
| | | | | 370/329 |
| 2015/0295690 | A1 | 10/2015 | Takeda et al. | |
| 2016/0198469 | A1 | 7/2016 | Zhu et al. | |
| 2016/0352551 | A1 | 12/2016 | Zhang | |
| 2018/0199314 | A1* | 7/2018 | Takeda | H04L 5/0082 |
| 2019/0191453 | A1* | 6/2019 | Xiong | H04L 5/0055 |
| 2020/0128541 | A1* | 4/2020 | Zhang | H04L 5/0091 |

FOREIGN PATENT DOCUMENTS

| | | |
|---|---|---|
| CN | 105979597 | 9/2016 |
| CN | 106162889 A | 11/2016 |
| CN | 106231614 A | 12/2016 |
| CN | 106455081 A | 2/2017 |
| CN | 106605438 B | 12/2019 |
| CN | 105979597 B | 2/2020 |
| EP | 2557679 A1 | 2/2013 |
| EP | 3110195 A1 | 12/2016 |
| WO | 2015142994 A1 | 9/2015 |
| WO | 2016192644 A1 | 12/2016 |
| WO | 2017038895 A1 | 3/2017 |

OTHER PUBLICATIONS

Second Office Action of the Chinese application No. 201780087949.1, dated Aug. 5, 2020.
First Office Action of the Chilean application No. 201902713, dated Aug. 28, 2020.
Second Office Action of the European application No. 17901939.3, dated Jan. 19, 2021.
Second Office Action of the Chilean application No. 201902713, dated Feb. 8, 2021.
Office Action of the Indian application No. 201917042986, dated Feb. 17, 2021.
Huawei et al.: "PUCCH resource allocation", 3GPP Draft; R1-155638, 3rd Generation Partnership Project (3GPP), Mobile Competence Centre ; 650, Route Des Lucioles ; F-06921 Sophia-Antipolis Cedex; France, vol. RAN WG1 , No. Malmö, Sweden; Oct. 5, 2015-Oct. 9, 2015 Oct. 4, 2015 (Oct. 4, 2015) , XP051039709, Retrieved from the Internet: URL: http://www.3gpp.org/ftp/Meetings_3GPP_SYNC/RAN1/Docs/ [retrieved on Oct. 4, 2015] * the whole document *.
Supplementary European Search Report in the European application No. 17901939.3, dated Mar. 10, 2020.
English translation of the Written Opinion of the International Search Authority in the international application No. PCT/CN2017/078063, dated Nov. 29, 2017.
Third Office Action of the Chinese application No. 201780087949.1, dated Sep. 24, 2020.
First Office Action of the European application No. 17901939.3, dated Sep. 18, 2020.
International Search Report in the international application No. PCT/CN2017/078063, Dated Nov. 29, 2017.
Written Opinion of the International Search Authority in the international application No. PCT/CN2017/078063, dated Nov. 29, 2017.
First Office Action of the Israeli application No. 269399, dated Oct. 31, 2021.
European Search Report in the European application No. 21210378.2, dated Feb. 16, 2022.

* cited by examiner

INFORMATION SENDING METHOD AND APPARATUS, TERMINAL, ACCESS NETWORK DEVICE AND SYSTEM

CROSS-REFERENCE TO RELATED APPLICATION

The present application is the U.S. national phase application of PCT Application No. PCT/CN2017/078063 filed on Mar. 24, 2017, the disclosure of which is incorporated herein in its entirety by reference.

TECHNICAL FIELD

The embodiments of the present disclosure relate to the field of communications, and in particular, to an information sending method and device, a terminal, an access network device and a system.

BACKGROUND

In a 5G New Radio (NR) system, an Ultra-Reliable Low-Latency Communication (URLLC) service is a newly introduced data service. Compared with existing services, the URLLC service requires higher reliability and lower latency. The URLLC service is commonly used in the fields of industrial Internet, automatic driving, and the like.

In the conventional art, there is no mature design scheme for a control channel of the URLLC service. However, in order to ensure high reliability of URLLC transmission, as the data size of Downlink Control Information (DCI) corresponding to the URLLC service is smaller, the reliability is better.

Therefore, how to design DCI with a small size for a URLLC service is still a problem to be solved.

SUMMARY

In order to solve the problem that the current transmission design of an RS and a UCI of a short PUCCH is not available, an embodiment of the present disclosure provides an uplink transmission method and device, a terminal, an access network device and a system. The technical solutions are as follows:

According to a first aspect of the embodiment of the present disclosure, an information sending method is provided. The method may include the following operations:

An access network device determines a first frequency domain resource pattern among K frequency domain resource patterns, each frequency domain resource pattern corresponding to at least one frequency domain resource, K being a positive integer.

The access network device sends DCI to a terminal, the DCI being used for indicating an index of the first frequency domain resource pattern, the frequency domain resource corresponding to the first frequency domain resource pattern being used for transmitting service data of the terminal.

In a possible implementation manner, the K frequency domain resource patterns may be pre-determined.

In a possible implementation manner, before the access network device sends DCI to a terminal, the method may further include the following operation.

The access network device sends first configuration information to the terminal, the first configuration information being used for indicating the K frequency domain resource patterns.

In a possible implementation manner, the first configuration information may be carried in at least one of a Master Information Block (MIB), a System Information Block (SIB), a Radio Resource Control (RRC) message, a Medium Access Control (MAC) Control Element (CE), or DCI.

In a possible implementation manner, before the access network device sends the DCI to a terminal, the method may further include the following operations.

The access network device sends second configuration information to the terminal, the second configuration information being used for indicating a frequency domain resource range, frequency domain resources in the frequency domain resource range being used for carrying the service data.

The access network device sends third configuration information to the terminal, the third configuration information being used for indicating to divide the frequency domain resources in the frequency domain resource range into K groups.

In a possible implementation manner, second configuration information may be pre-determined or obtained by the terminal by performing mapping according to a preset parameter, the second configuration information being used for indicating a frequency domain resource range, frequency domain resources in the frequency domain resource range being used for carrying the service data.

Before the access network device sends the DCI to a terminal, the method may further include the following operation.

The access network device sends third configuration information to the terminal, the third configuration information being used for indicating to divide the frequency domain resources in the frequency domain resource range into K groups.

In a possible implementation manner, third configuration information may be pre-determined, the third configuration information being used for indicating to divide frequency domain resources in a frequency domain resource range into K groups, the frequency domain resources in the frequency domain resource range being used for carrying the service data.

Before the access network device sends the DCI to a terminal, the method may further include the following operation.

The access network device sends second configuration information to the terminal, the second configuration information being used for indicating the frequency domain resource range.

In a possible implementation manner, the third configuration information may be carried in at least one of an MIB, an SIB, an RRC message, an MAC CE, or DCI.

In a possible implementation manner, the second configuration information may be carried in at least one of an MIB, an SIB, an RRC message, an MAC CE, or DCI.

In a possible implementation manner, before the access network device sends the DCI to a terminal, the method may further include the following operations.

The access network device sends fourth configuration information to the terminal, the fourth configuration information being used for indicating at least two frequency domain resource ranges, frequency domain resources in each frequency domain resource range being used for carrying the service data.

The access network device sends fifth configuration information to the terminal, the fifth configuration information being used for indicating an index of a specified frequency domain resource range W occupied by the K frequency domain resource patterns, the specified frequency domain resource range being all or a part of the at least two frequency domain resource ranges.

The access network device sends sixth configuration information to the terminal, the sixth configuration information being used for indicating to divide frequency domain resources in the specified frequency domain resource range into K groups.

In a possible implementation manner, fourth configuration information may be pre-determined, the fourth configuration information being used for indicating at least two frequency domain resource ranges, frequency domain resources in the at least two frequency domain resource ranges being used for carrying the service data.

Before the access network device sends the DCI to a terminal, the method may further include the following operations.

The access network device sends fifth configuration information to the terminal, the fifth configuration information being used for indicating an index of a specified frequency domain resource range W occupied by the K frequency domain resource patterns within a predetermined time period, the specified frequency domain resource range being all or a part of the at least two frequency domain resource ranges.

The access network device sends sixth configuration information to the terminal, the sixth configuration information being used for indicating to divide frequency domain resources in the specified frequency domain resource range into K groups.

In a possible implementation manner, fifth configuration information may be obtained by the terminal by performing mapping according to a preset parameter, the fifth configuration information being used for indicating a specified frequency domain resource range occupied by the K frequency domain resource patterns, the specified frequency domain resource range being all or a part of the at least two frequency domain resource ranges.

Before the access network device sends the DCI to a terminal, the method may further include the following operations.

The access network device sends fourth configuration information to the terminal, the fourth configuration information being used for indicating at least two frequency domain resource ranges, frequency domain resources in the at least two frequency domain resource ranges being used for carrying the service data.

The access network device sends sixth configuration information to the terminal, the sixth configuration information being used for indicating to divide frequency domain resources in the specified frequency domain resource range into K groups.

In a possible implementation manner, sixth configuration information may be pre-determined, the sixth configuration information being used for indicating to divide frequency domain resources in a frequency domain resource range into K groups.

Before the access network device sends the DCI to a terminal, the method may further include the following operations.

The access network device sends fourth configuration information to the terminal, the fourth configuration information being used for indicating at least two frequency domain resource ranges, frequency domain resources in the at least two frequency domain resource ranges being used for carrying the service data.

The access network device sends fifth configuration information to the terminal, the fifth configuration information being used for indicating the specified frequency domain resource range W occupied by the K frequency domain resource patterns, the specified frequency domain resource range being all or a part of the at least two frequency domain resource ranges.

In a possible implementation manner, fourth configuration information may be pre-determined, the fourth configuration information being used for indicating at least two frequency domain resource ranges, frequency domain resources in the at least two frequency domain resource ranges being used for carrying the service data. Fifth configuration information may be obtained by the terminal by performing mapping according to a preset parameter, the fifth configuration information being used for indicating an index of a specified frequency domain resource range W occupied by the K frequency domain resource patterns, the specified frequency domain resource range being all or a part of the at least two frequency domain resource ranges.

Before the access network device sends the DCI to a terminal, the method may further include the following operation.

The access network device sends sixth configuration information to the terminal, the sixth configuration information being used for indicating to divide frequency domain resources in the specified frequency domain resource range into K groups.

In a possible implementation manner, fourth configuration information and sixth configuration information may be pre-determined, the fourth configuration information being used for indicating at least two frequency domain resource ranges, frequency domain resources in the at least two frequency domain resource ranges being used for carrying the service data, the sixth configuration information being used for indicating to divide frequency domain resources in a specified frequency domain resource range into K groups.

Before the access network device sends the DCI to a terminal, the method may further include the following operation.

The access network device sends fifth configuration information to the terminal, the fifth configuration information being used for indicating the specified frequency domain resource range W occupied by the K frequency domain resource patterns, the specified frequency domain resource range being all or a part of the at least two frequency domain resource ranges.

In a possible implementation manner, fifth configuration information may be obtained by the terminal by performing mapping according to a preset parameter, the fifth configuration information being used for indicating a specified frequency domain resource range occupied by the K frequency domain resource patterns, the specified frequency domain resource range being all or a part of at least two frequency domain resource ranges. Sixth configuration information may be pre-determined, the sixth configuration information being used for indicating to divide frequency domain resources in the specified frequency domain resource range into K groups.

Before the access network device sends the DCI to a terminal, the method may further include the following operation.

The access network device sends fourth configuration information to the terminal, the fourth configuration information being used for indicating the at least two frequency domain resource ranges, frequency domain resources in the at least two frequency domain resource ranges being used for carrying the service data.

In a possible implementation manner, the fourth configuration information may be carried in at least one of an MIB, an SIB, an RRC message, an MAC CE, or DCI.

In a possible implementation manner, the fifth configuration information may be carried in at least one of an MIB, an SIB, an RRC message, an MAC CE, or DCI.

In a possible implementation manner, the sixth configuration information may be carried in at least one of an MIB, an SIB, an RRC message, an MAC CE, or DCI.

In a possible implementation manner, before the access network device sends the DCI to a terminal, the method may further include the following operations.

The access network device sends seventh configuration information to the terminal, the seventh configuration information being used for indicating at least one frequency domain resource range, frequency domain resources in each frequency domain resource range being used for carrying the service data.

The access network device sends eighth configuration information to the terminal, the eighth configuration information being used for indicating a number of consecutive resource blocks occupied by each of the K frequency domain resource patterns in the frequency domain resource range.

The access network device sends ninth configuration information to the terminal, the ninth configuration information being used for indicating candidate frequency domain resource patterns among the K frequency domain resource patterns, the candidate frequency domain resource patterns being candidate patterns for the first frequency domain resource pattern.

In a possible implementation manner, seventh configuration information may be pre-determined, the seventh configuration information being used for indicating at least one frequency domain resource range, frequency domain resources in each frequency domain resource range being used for carrying the service data.

Before the access network device sends the DCI to a terminal, the method may further include the following operations.

The access network device sends eighth configuration information to the terminal, the eighth configuration information being used for indicating a number of consecutive resource blocks occupied by each of the K frequency domain resource patterns in the frequency domain resource range.

The access network device sends ninth configuration information to the terminal, the ninth configuration information being used for indicating candidate frequency domain resource patterns among the K frequency domain resource patterns, the candidate frequency domain resource patterns being candidate patterns for the first frequency domain resource pattern.

In a possible implementation manner, eighth configuration information may be pre-determined, the eighth configuration information being used for indicating a number of consecutive resource blocks occupied by each of the K frequency domain resource patterns in the frequency domain resource range.

Before the access network device sends the DCI to a terminal, the method may further include the following operations.

The access network device sends seventh configuration information to the terminal, the seventh configuration information being used for indicating at least one frequency domain resource range, frequency domain resources in each frequency domain resource range being used for transmitting and carrying the service data.

The access network device sends ninth configuration information to the terminal, the ninth configuration information being used for indicating candidate frequency domain resource patterns among the K frequency domain resource patterns, the candidate frequency domain resource patterns being candidate patterns for the first frequency domain resource pattern.

In a possible implementation manner, ninth configuration information may be obtained by the terminal by perfuming mapping according to a preset parameter, the ninth configuration information being used for indicating candidate frequency domain resource patterns among the K frequency domain resource patterns, the candidate frequency domain resource patterns being candidate patterns for the first frequency domain resource pattern.

Before the access network device sends the DCI to a terminal, the method may further include the following operations.

The access network device sends seventh configuration information to the terminal, the seventh configuration information being used for indicating at least one frequency domain resource range, frequency domain resources in each frequency domain resource range being used for carrying the service data.

The access network device sends eighth configuration information to the terminal, the eighth configuration information being used for indicating a number N of consecutive resource blocks occupied by each of the K frequency domain resource patterns in the frequency domain resource range.

In a possible implementation manner, seventh configuration information and eighth configuration information may be pre-determined, the seventh configuration information being used for indicating at least one frequency domain resource range, frequency domain resources in each frequency domain resource range being used for carrying the service data, the eighth configuration information being used for indicating a number N of consecutive resource blocks occupied by each of the K frequency domain resource patterns in the frequency domain resource range.

Before the access network device sends the DCI to a terminal, the method may further include the following operation.

The access network device sends ninth configuration information to the terminal, the ninth configuration information being used for indicating candidate frequency domain resource patterns among the K frequency domain resource patterns, the candidate frequency domain resource patterns being candidate patterns for the first frequency domain resource pattern.

In a possible implementation manner, seventh configuration information may be pre-determined, the seventh configuration information being used for indicating at least one frequency domain resource range, frequency domain resources in each frequency domain resource range being used for carrying the service data. Ninth configuration information may be obtained by the terminal by performing mapping according to a preset parameter, the ninth configuration information being used for indicating candidate frequency domain resource patterns among the K frequency domain resource patterns, the candidate frequency domain resource patterns being candidate patterns for the first frequency domain resource pattern.

Before the access network device sends the DCI to a terminal, the method may further include the following operation.

The access network device sends eighth configuration information to the terminal, the eighth configuration information being used for indicating a number of consecutive resource blocks occupied by each of the K frequency domain resource patterns in the frequency domain resource range.

In a possible implementation manner, eighth configuration information may be pre-determined, the eighth configuration information being used for indicating a number of consecutive resource blocks occupied by each of the K frequency domain resource patterns in the frequency domain resource range. Ninth configuration information may be obtained by the terminal by performing mapping according to a preset parameter, the ninth configuration information being used for indicating candidate frequency domain resource patterns among the K frequency domain resource patterns, the candidate frequency domain resource patterns being candidate patterns for the first frequency domain resource pattern.

Before the access network device sends the DCI to a terminal, the method may further include the following operation.

The access network device sends seventh configuration information to the terminal, the seventh configuration information being used for indicating at least one frequency domain resource range, frequency domain resources in each frequency domain resource range being used for carrying the service data.

In a possible implementation manner, the seventh configuration information may be carried in at least one of an MIB, an SIB, an RRC message, an MAC CE, or DCI.

In a possible implementation manner, the eighth configuration information may be carried in at least one of an MIB, an SIB, an RRC message, an MAC CE, or DCI.

In a possible, implementation manner, the ninth configuration information may be carried in at least one of an MIB, an SIB, an RRC message, an MAC CE, or DCI.

In a possible implementation manner, the DCI may carry an index of the first frequency domain resource pattern; or, the DCI may carry an offset value, and the terminal may be configured to obtain an index of the first frequency domain resource pattern by performing mapping according to the offset value and a preset parameter.

In a possible implementation manner, the preset parameter may include at least one of:

identification information of the terminal, identification information of a cell, identification information of a beam, identification information of a predetermined signal carried on a beam, indication information of a predetermined signal carried on a beam, information of frequency domain for transmission of the service data, or information of time domain for transmission of the service data.

According to a second aspect of the embodiment of the present disclosure, an information receiving method is provided. The method may include the following operations.

A terminal receives DCI, the DCI being used for indicating an index of a first frequency domain resource pattern.

The terminal determines the first frequency domain resource pattern among K frequency domain resource patterns according to the DCI, each frequency domain resource pattern corresponding to at least one frequency domain resource.

The frequency domain resource corresponding to the first frequency domain resource pattern is used for transmitting service data of the terminal.

In a possible implementation manner, the K frequency domain resource patterns may be pre-determined.

In a possible implementation manner, before the terminal determines the first frequency domain resource pattern among K frequency domain resource patterns according to the DCI, the method may further include the following operations:

The terminal receives first configuration information sent by an access network device, the first configuration information being used for indicating the K frequency domain resource patterns.

The terminal determines the K frequency domain resource patterns according to the first configuration information.

In a possible implementation manner, the first configuration information may be carried in at least one of an MIB, an SIB, an RRC message, an MAC CE, or DCI.

In a possible implementation manner, before the terminal determines the first frequency domain resource pattern among K frequency domain resource patterns according to the DCI, the method may further include the following operations.

The terminal receives second configuration information sent by the access network device, the second configuration information being used for indicating a frequency domain resource range, frequency domain resources in the frequency domain resource range being used for carrying the service data.

The terminal receives third configuration information sent by the access network device, the third configuration information being used for indicating to divide the frequency domain resources in the frequency domain resource range into K groups.

In a possible implementation manner, second configuration information may be pre-determined or obtained by the terminal by performing mapping according to a preset parameter, the second configuration information being used for indicating a frequency domain resource range, frequency domain resources in the frequency domain resource range being used for carrying the service data.

Before the terminal determines the first frequency domain resource pattern among K frequency domain resource patterns according to the DCI, the method may further include the following operation.

The terminal receives third configuration information sent by the access network device, the third configuration information being used for indicating to divide the frequency domain resources in the frequency domain resource range into K groups.

In a possible implementation manner, third configuration information may be pre-determined, the third configuration information being used for indicating to divide frequency domain resources in a frequency domain resource range into K groups, the frequency domain resources in the frequency domain resource range being used for carrying the service data.

Before the terminal determines the first frequency domain resource pattern among K frequency domain resource patterns according to the DCI, the method may further include the following operation.

The terminal receives second configuration information sent by an access network device, the second configuration information being used for indicating the frequency domain resource range.

In a possible implementation manner, the third configuration information may be carried in at least one of an MIB, an SIB, an RRC message, an MAC CE, or DCI.

In a possible implementation manner, the second configuration information may be carried in at least one of an MIB, an SIB, an RRC message, an MAC CE, or DCI.

In a possible implementation manner, before the terminal determines the first frequency domain resource pattern among K frequency domain resource patterns according to the DCI, the method may further include the following operations.

The terminal receives fourth configuration information sent by the access network device, the fourth configuration information being used for indicating at least two frequency domain resource ranges, frequency domain resources in each frequency domain resource range being used for carrying the service data.

The terminal receives fifth configuration information sent by the access network device, the fifth configuration information being used for indicating an index of a specified frequency domain resource range occupied by the K frequency domain resource patterns, the specified frequency domain resource range being all or a part of the at least two frequency domain resource ranges.

The terminal receives sixth configuration information sent by the access network device, the sixth configuration information being used for indicating to divide frequency domain resources in the specified frequency domain resource range into K groups.

In a possible implementation manner, fourth configuration information may be pre-determined, the fourth configuration information being used for indicating at least two frequency domain resource ranges, frequency domain resources in the at least two frequency domain resource ranges being used for carrying the service data.

Before the terminal determines the first frequency domain resource pattern among K frequency domain resource patterns according to the DCI, the method may further include the following operations.

The terminal receives fifth configuration information sent by the access network device, the fifth configuration information being used for indicating an index of a specified frequency domain resource range occupied by the K frequency domain resource patterns within a predetermined time period, the specified frequency domain resource range being all or a part of the at least two frequency domain resource ranges.

The terminal receives sixth configuration information sent by the access network device, the sixth configuration information being used for indicating to divide frequency domain resources in the specified frequency domain resource range into K groups.

In a possible implementation manner, fifth configuration information may be obtained by the terminal by performing mapping according to a preset parameter, the fifth configuration information being used for indicating an index of a specified frequency domain resource range occupied by the K frequency domain resource patterns, the specified frequency domain resource range being all or a part of the at least two frequency domain resource ranges.

Before the terminal determines the first frequency domain resource pattern among K frequency domain resource patterns according to the DCI, the method may further include the following operations.

The terminal receives fourth configuration information sent by the access network device, the fourth configuration information being used for indicating at least two frequency domain resource ranges, frequency domain resources in the at least two frequency domain resource ranges being used for carrying the service data.

The terminal receives sixth configuration information sent by the access network device, the sixth configuration information being used for indicating to divide frequency domain resources in the specified frequency domain resource range into K groups.

In a possible implementation manner, sixth configuration information may be pre-determined, the sixth configuration information being used for indicating to divide frequency domain resources in a frequency domain resource range into K groups.

Before the terminal determines the first frequency domain resource pattern among K frequency domain resource patterns according to the DCI, the method may further include the following operations.

The terminal receives fourth configuration information sent by the access network device, the fourth configuration information being used for indicating at least two frequency domain resource ranges, frequency domain resources in the at least two frequency domain resource ranges being used for carrying the service data.

The terminal receives fifth configuration information sent by the access network device, the fifth configuration information being used for indicating the specified frequency domain resource range occupied by the K frequency domain resource patterns, the specified frequency domain resource range being all or a part of the at least two frequency domain resource ranges.

In a possible implementation manner, fourth configuration information may be pre-determined, the fourth configuration information being used for indicating at least two frequency domain resource ranges, frequency domain resources in the at least two frequency domain resource ranges being used for carrying the service data. Fifth configuration information may be obtained by the terminal by performing mapping according to a preset parameter, the fifth configuration information being used for indicating an index of a specified frequency domain resource range occupied by the K frequency domain resource patterns, the specified frequency domain resource range being all or a part of the at least two frequency domain resource ranges.

Before the terminal determines the first frequency domain resource pattern among K frequency domain resource patterns according to the DCI, the method may further include the following operation.

The terminal receives sixth configuration information sent by the access network device, the sixth configuration information being used for indicating to divide frequency domain resources in the specified frequency domain resource range into K groups.

In a possible implementation manner, fourth configuration information and sixth configuration information may be pre-determined, the fourth configuration information being used for indicating at least two frequency domain resource ranges, frequency domain resources in the at feast two frequency domain resource ranges being used for carrying the service data, the sixth configuration information being used for indicating to divide frequency domain resources in a specified frequency domain resource range into K groups.

Before the terminal determines the first frequency domain resource pattern among K frequency domain resource patterns according to the DCI, the method may further include the following operation.

The terminal receives fifth configuration information sent by the access network device, the fifth configuration information being used for indicating the specified frequency domain resource range occupied by the K frequency domain resource patterns, the specified frequency domain resource range being all or a part of the at least two frequency domain resource ranges.

In a possible implementation manner, fifth configuration information may be obtained by the terminal by performing mapping according to a preset parameter, the fifth configuration information being used for indicating a specified frequency domain resource range occupied by the K frequency domain resource patterns, the specified frequency domain resource range being all or a part of at feast two frequency domain resource ranges. Sixth configuration information may be pre-determined, the sixth configuration information being used for indicating to divide frequency domain resources in the specified frequency domain resource range into K groups.

Before the terminal determines the first frequency domain resource pattern among K frequency domain resource patterns according to the DCI, the method may further include the following operation.

The terminal receives fourth configuration information sent by the access network device, the fourth configuration information being used for indicating the at least two frequency domain resource ranges, the at least two frequency domain resource ranges being used for carrying the service data.

In a possible implementation manner, the fourth configuration information may be carried in at least one of an MIB, an SIB, an RRC message, an MAC CE, or DCI.

In a possible implementation manner, the fifth configuration information may be carried in at least one of air MIB, an SIB, an RRC message, an MAC CE, or DCI.

In a possible implementation manner, the sixth configuration information may be carried in at least one of an MIB, an SIB, an RRC message, an MAC CE, or DCI.

In a possible implementation manner, before the terminal determines the first frequency domain resource pattern among K frequency domain resource patterns according to the DCI, the method may further include the following operations.

The terminal receives seventh configuration information sent by the access network device, the seventh configuration information being used for indicating at least one frequency domain resource range, frequency domain resources in each frequency domain resource range being used for carrying the service data.

The terminal receives eighth configuration information sent by the access network device, the eighth configuration information being used for indicating a number N of consecutive resource blocks occupied by each of the K frequency domain resource patterns in the frequency domain resource range.

The terminal receives ninth configuration information sent by the access network device, the ninth configuration information being used for indicating indexes of candidate frequency domain resource patterns among the K frequency domain resource patterns, the candidate frequency domain resource patterns being candidate patterns for the first frequency domain resource pattern.

In a possible implementation manner, seventh configuration information may be pre-determined, the seventh configuration information being used for indicating at least one frequency domain resource range, frequency domain resources in each frequency domain resource range being used for carrying the service data.

Before the terminal determines the first frequency domain resource pattern among K frequency domain resource patterns according to the DCI, the method may further include the following operations.

The terminal receives eighth configuration information sent by the access network device, the eighth configuration information being used for indicating a number of consecutive resource blocks occupied by each of the K frequency domain resource patterns in the frequency domain resource range.

The terminal receives ninth configuration information sent by the access network device, the ninth configuration information being used for indicating candidate frequency domain resource patterns among the K frequency domain resource patterns, the candidate frequency domain resource patterns being candidate patterns for the first frequency domain resource pattern.

In a possible implementation manner, eighth configuration information may be pre-determined, the eighth configuration information being used for indicating a number of consecutive resource blocks occupied by each of the K frequency domain resource patterns in the frequency domain resource range.

Before the terminal determines the first frequency domain resource pattern among K frequency domain resource patterns according to the DCI, the method may further include the following operations.

The terminal receives seventh configuration information sent by the access network device, the seventh configuration information being used for indicating at least one frequency domain resource range, frequency domain resources in each frequency domain resource range being used for transmitting, and carrying the service data.

The terminal receives ninth configuration information sent by the access network device, the ninth configuration information being used for indicating candidate frequency domain resource patterns among the K frequency domain resource patterns, the candidate frequency domain resource patterns being candidate patterns for the first frequency domain resource pattern.

In a possible implementation manner, ninth configuration information may be obtained by the terminal by performing mapping according, to a preset parameter, the ninth configuration information being used for indicating candidate frequency domain resource patterns among the K frequency domain resource patterns, the candidate frequency domain resource patterns being candidate patterns for the first frequency domain resource pattern.

Before the terminal determines the first frequency domain resource pattern among K frequency domain resource patterns according to the DCI, the method may further include the following operations.

The terminal receives seventh configuration information sent by the access network device, the seventh configuration information being used for indicating at least one frequency domain resource range, frequency domain resources in each frequency domain resource range being used for carrying the service data.

The terminal receives eighth configuration information sent by the access network device, the eighth configuration information being used for indicating a number of consecutive resource blocks occupied by each of the K frequency domain resource patterns in the frequency domain resource range.

In a possible implementation manner, seventh configuration information and eighth configuration information may be pre-determined, the seventh configuration information being used for indicating at least one frequency domain resource range, frequency domain resources in each frequency domain resource range being used for carrying the service data, the eighth configuration information being used for indicating a number of consecutive resource blocks occupied by each of the K frequency domain resource patterns in the frequency domain resource range.

Before the terminal determines the first frequency domain resource pattern among K frequency domain resource patterns according to the DCI, the method may further include the following operation.

The terminal receives ninth configuration information sent by the access network device, the ninth configuration information being used for indicating candidate frequency domain resource patterns among the K frequency domain resource patterns, the candidate frequency domain resource patterns being candidate patterns for the first frequency domain resource pattern.

In a possible implementation manner, seventh configuration information may be pre-determined, the seventh configuration information being used for indicating at least one frequency domain resource range, frequency domain resources in each frequency domain resource range being used for carrying the service data. Ninth configuration information may be obtained by the terminal by performing mapping according to a preset parameter, the ninth configuration information being used for indicating candidate frequency domain resource patterns among the K frequency domain resource patterns, the candidate frequency domain resource patterns being candidate patterns for the first frequency domain resource pattern.

Before the terminal determines the first frequency domain resource pattern among K frequency domain resource patterns according to the DCI, the method may further include the following operation.

The terminal receives eighth configuration information sent by the access network device, the eighth configuration information being used for indicating a number of consecutive resource blocks occupied by each of the K frequency domain resource patterns in the frequency domain resource range.

In a possible implementation manner, eighth configuration information may be pre-determined, the eighth configuration information being used for indicating a number of consecutive resource blocks occupied by each of the K frequency domain resource patterns in the frequency domain resource range. Ninth configuration information may be obtained by the terminal by performing mapping according to a preset parameter, the ninth configuration information being used for indicating candidate frequency domain resource patterns among the K frequency domain resource patterns, the candidate frequency domain resource patterns being candidate patterns for the first frequency domain resource pattern.

Before the terminal determines the first frequency domain resource pattern among K frequency domain resource patterns according to the DCI, the method may further include the following operation.

The terminal receives seventh configuration information sent by the access network device, the seventh configuration information being used for indicating at least one frequency domain resource range, frequency domain resources in each frequency domain resource range being used for carrying the service data.

In a possible implementation manner, the seventh configuration information may be carried in at least one of an MIB, an SIB, an RRC message, an MAC CE, or DCI.

In a possible implementation manner, the eighth configuration information may be carried in at least one of an MIB, an SIB, an RRC message, an MAC CE, or DCI.

In a possible, implementation manner, the ninth configuration information may be carried in at least one of an MIB, an SIB, an RRC message, an MAC CE, or DCI.

In a possible implementation manner, the DCI may carry an index of the first frequency domain resource pattern; or, the DCI may carry an offset value, and the terminal may be configured to determine the first frequency domain resource pattern according to the offset value and a mapping value, the mapping value being obtained by the terminal by performing mapping according to a preset parameter.

In a possible implementation manner, the preset parameter may include at least one of:

identification information of the terminal, identification information of a cell, identification information of a beam, identification information of a predetermined signal carried on a beam, indication information of a predetermined signal carried on a beam, information of frequency domain for transmission of the service data, or information of time domain for transmission of the service data.

According to a third aspect of the embodiment of the present disclosure, an information sending device is provided. The information sending device may include at least one unit. The at least one unit may be configured to implement the information sending method provided by the first aspect or any one optional implementation manner in the first aspect.

According to a fourth aspect of the embodiment of the present disclosure, an information receiving device is provided. The information receiving device may include at least one unit. The at least one unit may be configured to implement the information receiving method provided by the second aspect or any one optional implementation manner in the second aspect.

According to a fifth aspect of the embodiment of the present disclosure, an access network device is provided. The access network device may include a processor, a memory, a transmitter and a receiver. The processor may be configured to store one or more than one instructions that are instructed to be executed by the processor. The processor may be configured to implement the information sending method provided by the first aspect or any one optional implementation manner in the first aspect.

According to a sixth aspect of the embodiment of the present disclosure, a terminal is provided. The terminal may include a processor, a memory, a transmitter and a receiver. The processor may be configured to store one or more than one instructions that are instructed to be executed by the processor. The processor may be configured to implement the information receiving method provided by the second aspect or any one optional implementation manner in the second aspect.

According to a seventh aspect of the embodiment of the present disclosure, a computer-readable medium is provided. The computer-readable medium may store one or more than one instructions that are instructed to implement the information sending method provided by the first aspect or any one optional implementation manner in the first aspect.

According to an eighth aspect of the embodiment of the present disclosure, a computer-readable medium is provided. The computer-readable medium may store one or more than one instructions that are instructed to implement the information receiving method provided by the second aspect or any one optional implementation manner in the second aspect.

According to a ninth aspect of the embodiment of the present disclosure, an information sending system is provided. The information sending system may include an access network device and a terminal. The access network device may include the information sending device provided by the third aspect or any one optional implementation manner in the third aspect. The terminal may include the information receiving device provided by the fourth aspect or any one optional implementation manner in the fourth aspect.

According to a tenth aspect of the embodiment of the present disclosure, an information sending system is provided. The information sending system may include an access network device and a terminal. The access network device may be the access network device provided by the fifth aspect or any one optional implementation manner in the fifth aspect. The terminal may be the terminal provided by the sixth aspect or any one optional implementation manner in the sixth aspect.

The beneficial effects of the technical solutions provided by the embodiment of the present disclosure are as follows.

K frequency domain resource patterns are provided in advance for transmitting service data, and when it is necessary for an access network device to allocate frequency domain resources corresponding to one or more frequency domain resource patterns to a terminal, DCI requires only a very few bits to indicate an index of a first frequency domain resource pattern, thereby enabling the size of the DCI to be relatively small, increasing the transmission reliability and transmission efficiency of the DCI, and reducing the number of retransmissions.

BRIEF DESCRIPTION OF DRAWINGS

In order to describe the technical solutions in the embodiments of the present disclosure more clearly, the drawings required to be used in descriptions about the embodiments will be simply introduced below. Obviously, the drawings in the following descriptions are only some embodiments of the present disclosure. Those of ordinary skill in the art may further obtain other drawings according to these drawings without creative work.

DETAILED DESCRIPTION

In order to make the objectives, technical solutions and advantages of the present disclosure clearer, the implementation manners of the present disclosure will be further described in detail in conjunction with the accompanying drawings.

"Module" as referred to herein generally refers to a program or instruction stored in a memory that is capable of performing certain functions, "Unit" as referred to herein generally refers to a functional structure that is logically divided. The "unit" may be implemented by pure hardware or a combination of hardware and software.

"Multiple" as referred to herein means two or more. The term "and/or" is an association describing associated objects, indicating that there may be three relationships. For example, A and/or B may indicate that A exists separately, both A and B exist simultaneously, and B exists separately. The character "/" generally indicates that the contextual object is an "or" relationship. The words "first", "second" and similar terms used in the specification and claims of the present disclosure do not denote any order, quantity, or importance, but are merely used to distinguish different components.

Figure 1:
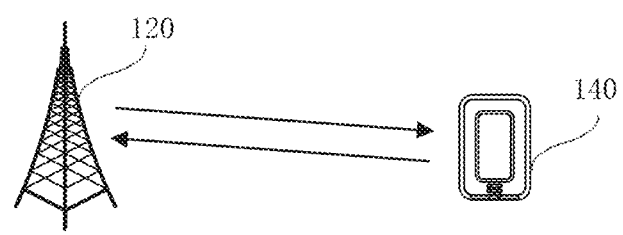
FIG. 1 is a schematic structure diagram of a mobile communication system according to an exemplary embodiment of the present disclosure.

Referring to FIG. 1, it shows a schematic structure diagram of a mobile communication system according to an embodiment of the present disclosure. The mobile communication system may be a 5G system, also known as an NR system. The mobile communication system includes an access network device 120 and a terminal 140.

The access network device 120 may be a base station. For example, the base station may be a base station (gNB) employing a central distributed architecture in the 5G system. When the access network device 120 employs the central distributed architecture, it generally includes a Central Unit (CU) and at least two Distributed Units (DUs). The CU is provided with protocol stacks of a Packet Data Convergence Protocol (PDCP) layer, a Radio Link Control (RLC) layer, and a Media Access Control (MAC) layer. The DU is provided with a physical (PHY) layer protocol stack. The specific implementation manner of the access network device 120 in the embodiment of the present disclosure is not limited. Optionally, the access network device may further include a Home eNB (HeNB), a relay, a pico, and the like.

The access network device 120 and the terminal 140 establish a wireless connection through a wireless radio. Optionally, the wireless radio is a wireless radio based on a fifth generation mobile communication network technology (5G) standard. For example, the wireless NR is an NR; or the wireless radio may also be a wireless radio based on the next generation mobile communication network technology standard of 5G.

The terminal 140 may be a device that provides voice and/or data connectivity to a user. The terminal may communicate with one or more core networks through a Radio Access Network (RAN). For example, the terminal 140 may be a mobile terminal such as a mobile phone (or a "cellular" phone) and a computer with a mobile terminal. For example, the terminal may also be a portable, pocket-sized, hand-held, computer-integrated or in-vehicle mobile device. For example, it is a subscriber unit, a subscriber station, a mobile station, a mobile, a remote station, an access point, a remote terminal, an access terminal, a user terminal, a user agent, a user device, or a user equipment.

It should be noted that, in the mobile communication system shown in FIG. 1, multiple access network devices 120 and/or multiple terminals 140 may be included. One access network device 120 and one terminal 140 shown in FIG. 1 are taken as an example, but the present embodiment does not limit this.

Currently, one conventional slot in an NR is defined as 7 or 14 symbols. In order to shorten the transmission tune of URLLC service data, it may be necessary to introduce a mini-slot, and the number of symbols occupied by the mini-slot is smaller than the number of symbols occupied by the conventional slot.

Figure 2:
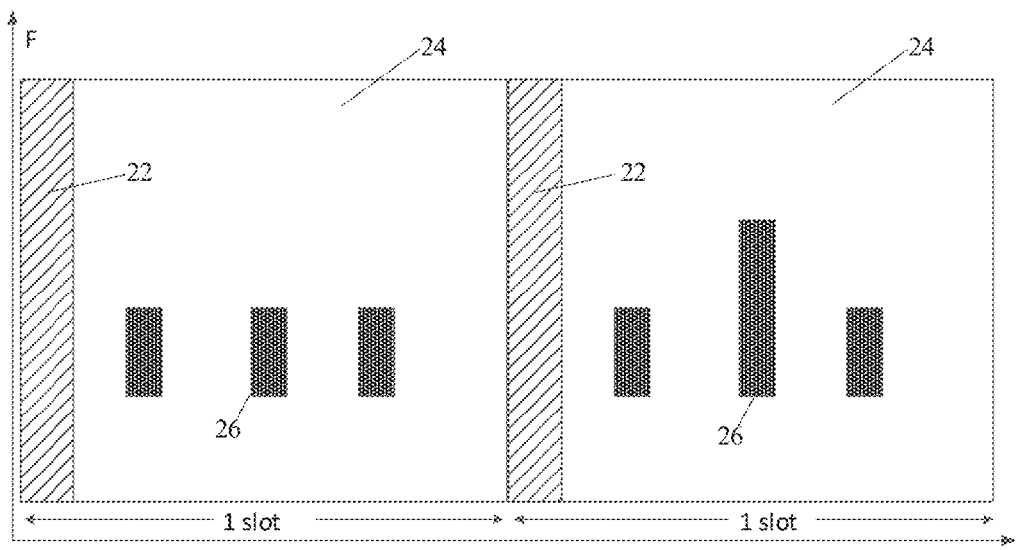
FIG. 2 is a schematic diagram of resources of a URLLC service during transmission according to an exemplary embodiment of the present disclosure.

FIG. 2 is a schematic diagram of time-frequency resource multiplexing of an enhanced Mobile Broad Band (eMBB) service and a URLLC service. The abscissa T in FIG. 2 represents a time domain, and the abscissa F represents a frequency domain. It is exemplified by a slot occupying 7 symbols. One or more symbols 22 at the beginning of the slot are used to transmit a control channel of an eMMB service (where part of time-frequency resources may also be used for other purposes), and the following symbols 24 are used to transmit service data of an eMBB service. Among the time-frequency resources included in these symbols 24, some time-frequency resources may be occupied by the URLLC service. Since the URLLC service requires a lower delay, there may be multiple time-frequency resources 26 occupied by service data of a URL LC service in one slot.

A control channel for the URLLC service may be transmitted together with the service data of the URLLC service, or may be transmitted together with the service data of the eMBB service, and may also be transmitted together with the control channel of the eMBB service. Regardless of which transmission is used, the high reliability of the control channel of the URLLC service must be guaranteed, and therefore, the control channel of the URLLC service is required to have a small size.

Figure 3:
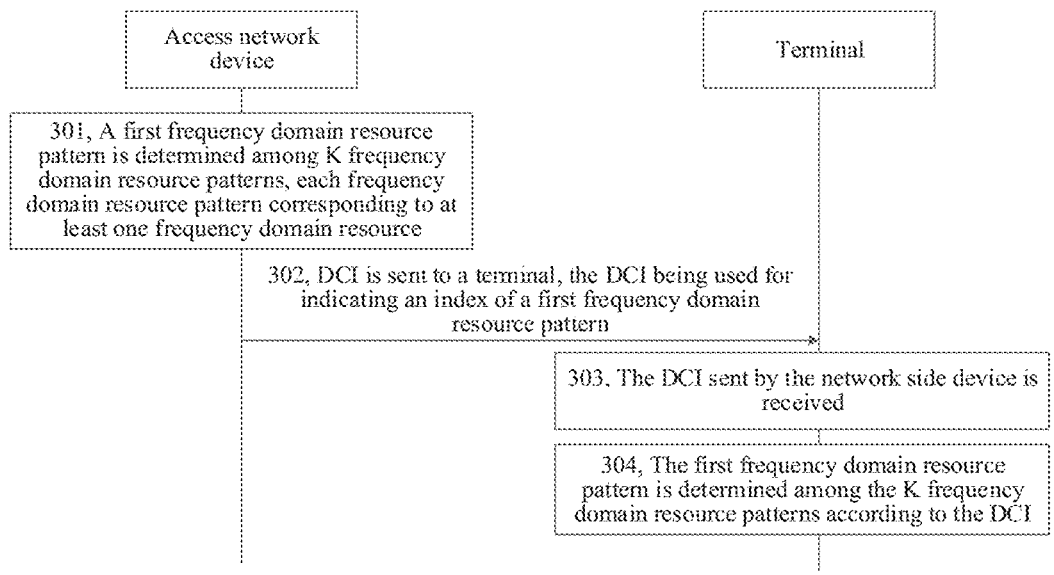
FIG. 3 is a schematic flowchart of an information sending method according to an exemplary embodiment of the present disclosure.

FIG. 3 is a schematic flowchart of an information sending method according to an exemplary embodiment of the present disclosure. The present embodiment is exemplified by applying the information sending method to the mobile terminal system shown in FIG. 1. The method includes the following operations.

At step 301, an access network device determines a first frequency domain resource pattern among K frequency domain resource patterns, each frequency domain resource pattern corresponding to at least one frequency domain resource.

The access network device pre-allocates K frequency domain resource patterns. Each frequency domain resource pattern corresponds to at least one frequency domain resource. The frequency domain resource may be a Physical Resource Block (PRB) or a Resource Element (RE). K is a positive integer, and optionally, $K \geq 2$.

Optionally, each of the K frequency domain resource patterns is a basic RE that can be separately configured. The access network device may allocate at least one frequency domain resource pattern among the K frequency domain resource patterns to the terminal to transmit uplink service data or downlink service data. Optionally, the downlink service data is a URLLC service.

Optionally, when the service data is a URLLC service, each frequency domain resource pattern includes at least one PRB, or at least two PRBs, or multiple PRBs. If each frequency domain resource pattern includes at least two PRBs, that is, at least two PRBs are used as basic scheduling units, the DCI size can be reduced, and the occupation of time domain resources can be shortened, thereby reducing transmission delay and improving demodulation performance.

Optionally, when one frequency domain resource pattern includes at least two PRBs, at least two PRBs are consecutive, or discrete, or equally spaced. When at least two PRBs in the same frequency domain resource pattern are equally spaced, a better frequency diversity gain can be obtained.

Figure 4:
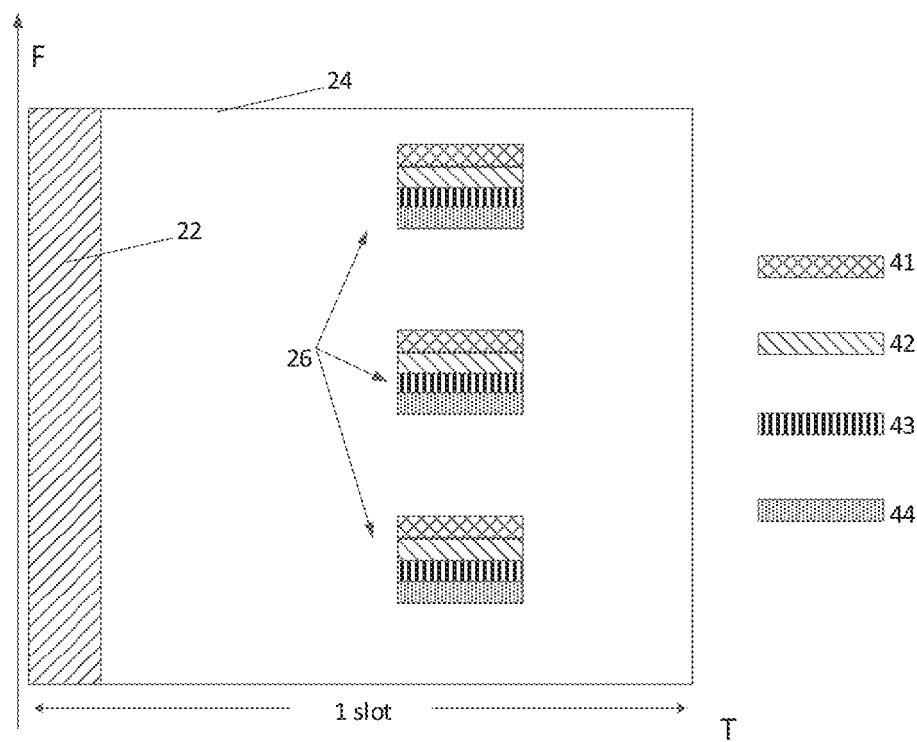
FIG. 4 is a schematic pattern diagram of K frequency domain resource patterns according to an exemplary embodiment of the present disclosure.

Schematically, referring to FIG. 4, in a typical slot, one or more symbols 22 located at the front of the slot are used to transmit a control channel of an eMBB service, and multiple symbols 24 located at the rear of the slot are used to transmit service data of the eMBB service. Part of the frequency domain resources 26 are allocated in the multiple symbols 24 for carrying service data of a URLLC service.

The frequency domain resources 26 for carrying the URLLC service are divided into K=4 groups, and the four groups of frequency domain resources 26 form four frequency domain resource patterns: a frequency domain resource pattern 00, a frequency domain resource pattern 01, a frequency domain resource pattern 10, and a frequency domain resource pattern 11. Each frequency domain resource pattern can be used as a separately schedulable RE. PRBs in each frequency domain resource pattern are equally spaced.

At step 302, the access network device sends DCI to a terminal, the DCI being used for indicating an index of a first frequency domain resource pattern.

A frequency domain unit corresponding to the first frequency domain resource pattern is a resource allocated by the access network device to the terminal for use.

The frequency domain resource corresponding to the first frequency domain resource pattern is used for carrying service data of the terminal. The service data may be uplink service data or downlink service data. Exemplarily, the service data is service data of the URLLC service.

Optionally, each frequency domain resource pattern corresponds to a respective index. The access network device sends DCI to the terminal, the DCI being used for indicating an index of the first frequency domain resource pattern.

Schematically, referring to FIG. 4, the DCI may use 2 bits to indicate the index of the first frequency domain resource pattern. If the value is 00, the first frequency domain resource pattern is the frequency domain resource pattern 41; if the value is 01, the first frequency domain resource pattern is the frequency domain resource pattern 42; if the value is 10, the first frequency domain resource pattern is the frequency domain resource pattern 43; and if the value is 11, the first frequency domain resource pattern is the frequency domain resource pattern 44.

Optionally, the access network device sends the DCI to the terminal on a pre-configured resource. The resource configuration mode for transmitting the DCI is not limited in the embodiment of the present disclosure. The DCI may also have other names in an NR system or a subsequent evolution system. The specific name of the DCI is not limited in the embodiment of the present disclosure.

At step 303, the terminal receives the DCI sent by the network side device.

Correspondingly, the terminal receives the DCI sent by the network side device on a pre-configured resource.

At step 304, the terminal determines the first frequency domain resource pattern among the K frequency domain resource patterns according to the DCI.

Schematically, the DCI carries an index 01 of the first frequency domain resource pattern, and the terminal determines, according to the index 01, the first frequency domain resource pattern as the frequency domain resource pattern 42 among the K frequency domain resource patterns.

The terminal sends service data or receives service data on the frequency domain resource corresponding to the first frequency domain resource pattern. For example, the access network device sends URLLC service data on the frequency domain resource corresponding to the first frequency domain resource pattern, and the terminal detects and receives the URLLC service data on the frequency domain resource corresponding to the first frequency domain resource pattern.

According to the information sending method provided by the present embodiment, K frequency domain resource patterns are provided in advance for transmitting service data, and when it is necessary for an access network device to allocate resources corresponding to one or more frequency domain resource patterns to a terminal, DCI requires only a very few bits to indicate an index of a first frequency domain resource pattern, thereby enabling the size of the DCI to be relatively small, increasing the transmission reliability and transmission efficiency of the DCI, and reducing the number of retransmissions.

In an optional embodiment based on FIG. 3, the K frequency domain resource patterns used to carry the service data are pre-determined by a communication protocol, or pre-configured by a network side, or part of division parameters of the K frequency domain resource patterns are pre-defined by the communication protocol, and another part of the division parameters are pre-configured by the network side.

When the access network device sends configuration information of the K frequency domain resource patterns to the terminal, the configuration information may be carried in at least one of the following signaling:
 a Master Information Block (MIB);
 a System Information Block (SIB);
 a Radio Resource Control (RRC) message;
 a Medium Access Control (MAC) Control Element (CE); or
 DCI.

The K frequency domain resource patterns include multiple pieces of related information such as a frequency domain resource range occupied by K frequency domain resource patterns, a value of K, a number of PRBs occupied by each frequency domain resource pattern, consecutive or discrete (such as equally spaced) various PRBs in each frequency domain resource pattern, and an index of each frequency domain resource pattern, so the configuration mode of the K frequency domain resource patterns may be as follows:
 first, K frequency domain resource patterns are configured by a piece of configuration information;
 second, K frequency domain resource patterns are configured by two pieces of configuration information;
 third, K frequency domain resource patterns are configured by three pieces of configuration information,
 where each piece of configuration information may be transmitted by one or a combination of multiple signaling. When transmitted by a combination of multiple signaling, each signaling is used to transmit a part of the content of a piece of configuration information.

Figure 5:
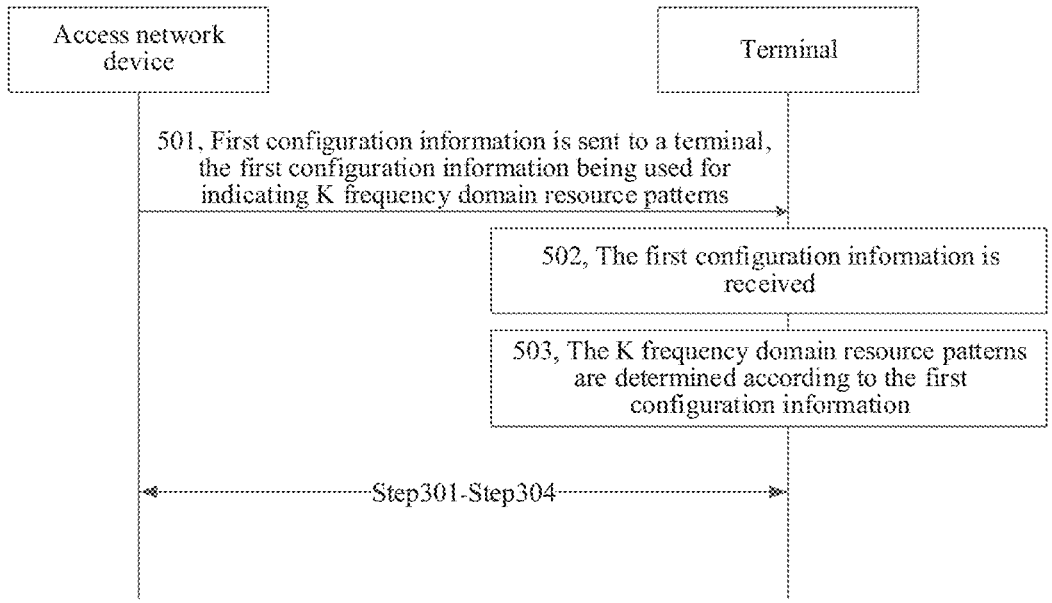
FIG. 5 is a schematic flowchart of an information sending method according to an exemplary embodiment of the present disclosure.

FIG. 5 shows a schematic flowchart of an information sending method according to an exemplary, embodiment of the present disclosure. In the present embodiment, as an example of description, the access network device configures related information of K frequency domain resource patterns to the terminal through a piece of configuration information. The method includes the following operations.

At step 501, an access network device sends first configuration information to a terminal, the first configuration information being used for indicating K frequency domain resource patterns.

Optionally, the first configuration, information is carried in any one (or at least one) of an MIB, an SIB, an RRC message, an MAC CE, and DCI.

For example, the access network device sends an RRC message to the terminal. The RRC message carries first configuration information. The first configuration information includes at least one parameter of a frequency domain resource range occupied by K frequency domain resource patterns, a value of K, a number of PRBs occupied by each frequency domain resource pattern, consecutive or discrete various PRBs in each frequency domain resource pattern, and an index of each frequency domain resource pattern.

At step 502, the terminal receives the first configuration information.

At step 503, the K frequency domain resource patterns are determined according to the first configuration information.

For example, the terminal receives an RRC message sent by the access network device, where the RRC message carries first configuration information, and the terminal determines K frequency domain resource patterns according to various parameters in the first configuration information.

Optionally, the K frequency domain resource patterns configured by the RRC message are as shown in FIG. 4.

Optionally, after determining the K frequency domain resource patterns, the terminal performs step 301 to step 304 between the access network device and the terminal.

In the information sending method provided by the present embodiment, the access network device indicates K frequency domain resource patterns to the terminal by using a piece of configuration information, which can save the number of signaling interactions between the access network device and the terminal, and shorten the time consumption of the configuration process.

Figure 6:
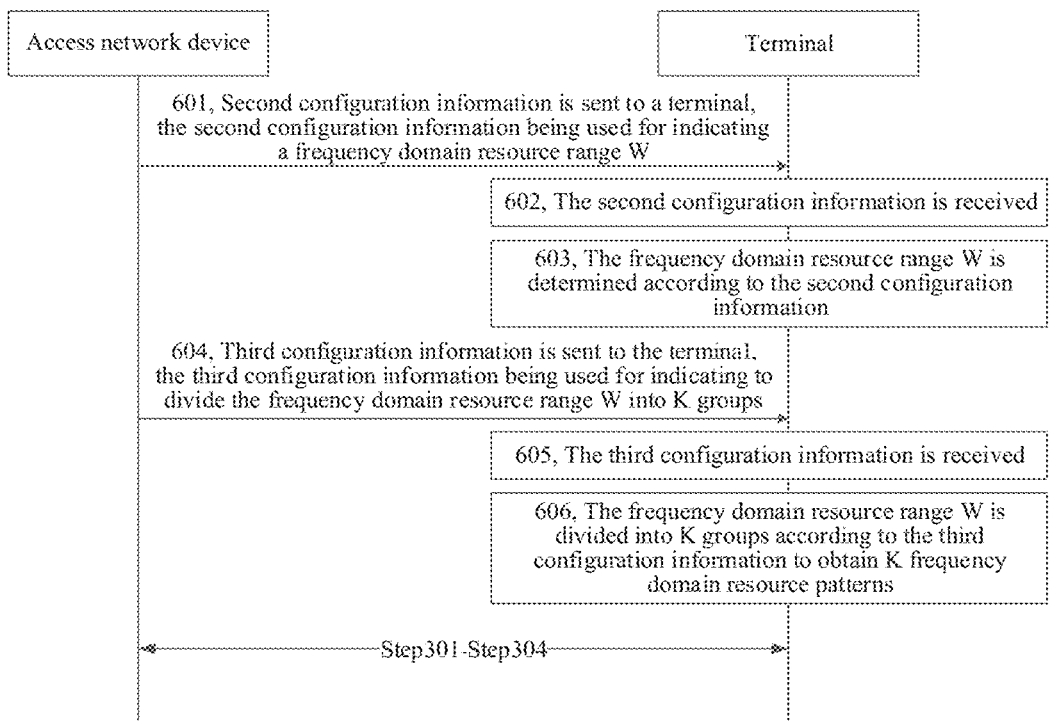
FIG. 6 is a schematic flowchart of an information sending method according to an exemplary embodiment of the present disclosure.

FIG. 6 shows a schematic flowchart of an information sending method according to an exemplary embodiment of the present disclosure. In the present embodiment, as an example of description, the access network device configures related information of K frequency domain resource patterns to the terminal through two pieces of configuration information. The method includes the following operations:

At step 601, an access network device sends second configuration information to a terminal, the second configuration information being used for indicating a frequency domain resource range W.

A frequency domain resource in the frequency domain resource range W is used to carry service data, and the service data is uplink service data or downlink service data. Optionally, the downlink service data is service data of a URLLC service.

Optionally, the second configuration information is carried in any one (or at least one) of an MIB, an SIB, an RRC message, an MAC CE, and DCI.

Schematically, the access network device sends an RRC message to the terminal, where the RRC message carries second configuration information. The second configuration information is used to indicate a frequency domain resource range W that carries a URLLC. Optionally, the frequency domain resource range W includes consecutive multiple PRBs, and the frequency domain resource range W is identified by using an index range of the PRB.

Figure 7:
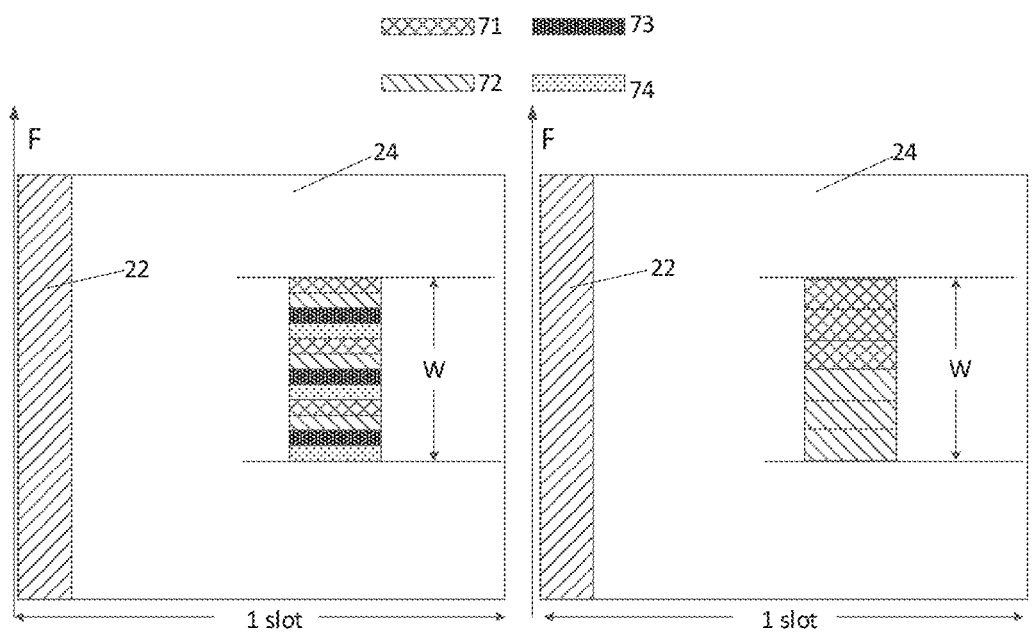
FIG. 7 is a schematic pattern diagram of K frequency domain resource patterns according to an exemplary embodiment of the present disclosure.

Referring to FIG. 7, in a typical slot, one or more symbols 22 located at the front of the slot are used to transmit a control channel of an eMBB service, and multiple symbols 24 located at the rear of the slot are used to transmit service data of the eMBB service. Part of the frequency domain resource ranges W in the multiple symbols 24 are used for carrying service data of a URLLC service.

At step 602, the terminal receives the second configuration information.

Schematically, the terminal receives the second configuration information in an RRC message. The second configuration information carries a PRB index corresponding to the frequency domain resource range W.

At step 603, the terminal determines the frequency domain resource range W according to the second configuration information.

For example, if a PRB index range is (A, B) and B−A+1=12, the terminal determines 12 PRBs as the frequency domain resource range W according to the index range.

At step 604, the access network device sends third configuration information to the terminal, the third configuration information being used for indicating to divide the frequency domain resources in the frequency domain resource range W into K groups.

Optionally, the third configuration information is carried in any one (or at least one) of an MIB, an SIB, an RRC message, an MAC CE, and DCI.

Schematically, the access network device sends an MAC CE message to the terminal, where the MAC CE message carries third configuration information. The third configuration information is used for indicating to divide the frequency domain resources in the frequency domain resource range W into K groups.

For example, the third configuration information may use two bits 11 to represent K=4, or K=2; and/or, the third configuration information may use 1 bit to indicate that the PRBs in the K frequency domain resource patterns are discrete or consecutive. When the PRBs in the K frequency domain resource patterns are discrete, the PRBs in each frequency domain resource pattern are equally spaced, and the PRBs between different frequency domain resource patterns alternately appear. Optionally, the arrangement mode of the PRBs is pre-determined by a communication protocol, and the third configuration information is not required to be explicitly configured.

In the left figure of FIG. 7, a scenario in which K=4 and PRBs between frequency domain resource patterns are alternately arranged is shown, that is, a PRB of a frequency domain resource pattern 72 appears below a RRB corresponding to a frequency domain resource pattern 71. A PRB of a frequency domain resource pattern 73 appears below the RRB corresponding to the frequency domain resource pattern 72. A PRB of a frequency domain resource pattern 74 appears below the RRB corresponding to the frequency domain resource pattern 73.

In the right figure of FIG. 7, a scenario in which K=2 and PRBs in frequency domain resource patterns are consecutively arranged is shown, that is, various PRBs of the frequency domain resource pattern 71 are consecutively arranged, and various PRBs of the frequency domain resource pattern 72 are consecutively arranged.

At step 605, the terminal receives the third configuration information.

Schematically, the terminal receives an MAC CE message, where the MAC CE message carries third configuration information.

At step 606, the terminal divides frequency domain resources in the frequency domain resource range W into K groups according to the third configuration information to determine K frequency domain resource patterns.

Optionally, after determining the K frequency domain resource patterns, the terminal performs step 301 to step 304 between the access network device and the terminal.

Schematically, if the K frequency domain resource patterns are shown in the left figure of FIG. 7, the access network device may use 2 bits in DCI to indicate an index of the first frequency domain resource pattern. If the value is 00, the first frequency domain resource pattern is the frequency domain resource pattern 71; if the value is 01, the first frequency domain resource pattern is the frequency domain resource pattern 72; if the value is 10, the first frequency domain resource pattern is the frequency domain resource pattern 73; and if the value is 11, the first frequency domain resource pattern is the frequency domain resource pattern 74.

If the K frequency domain resource patterns are shown in the right figure of FIG. 7, the access network device may use 1 bits in DCI to indicate an index of the first frequency domain resource pattern. If the value is 0, the first frequency domain resource pattern is the frequency domain resource pattern 71; and if the value is 1, the first frequency domain resource pattern is the frequency domain resource pattern 72.

Figure 8:
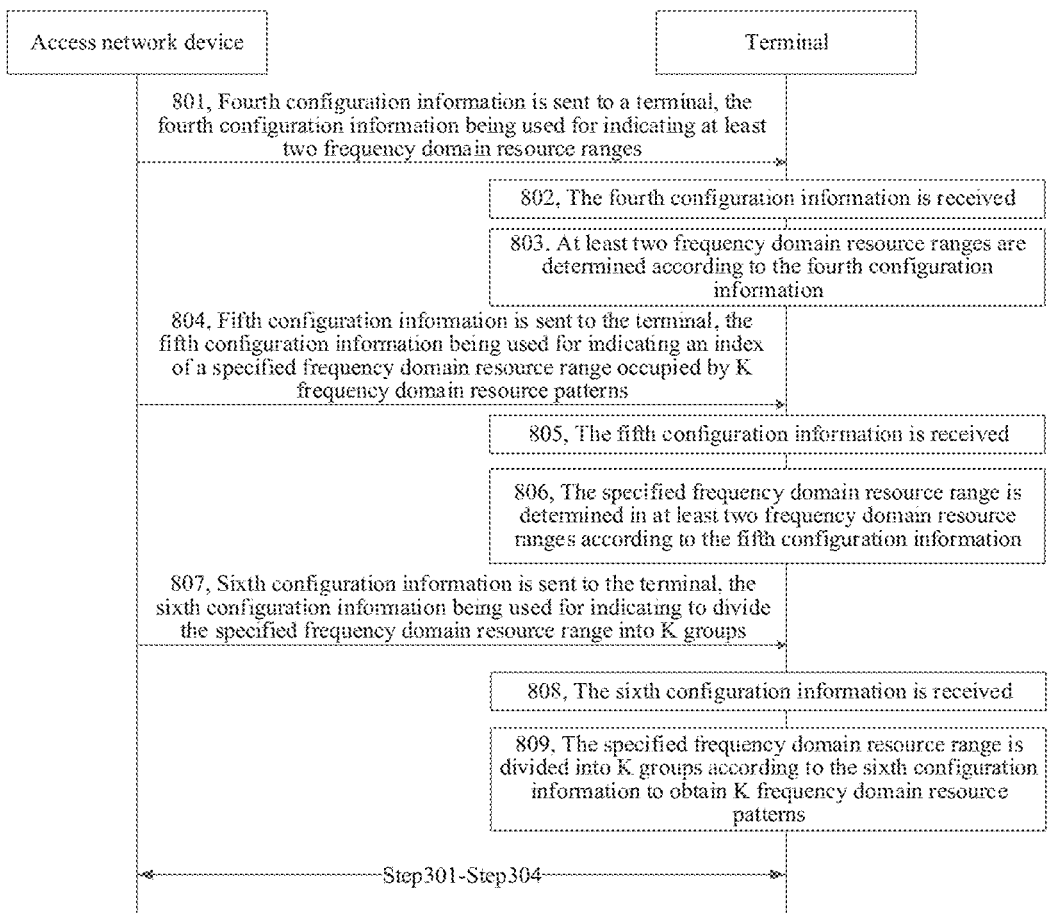
FIG. 8 is a schematic flowchart of an information sending method according to an exemplary embodiment of the present disclosure.

FIG. 8 shows a schematic flowchart of an information sending method according to an exemplary embodiment of the present disclosure. In the present embodiment, as an example of description, the access network device configures related information of K frequency domain resource patterns to the terminal through three pieces of configuration information. The method includes the following operations.

At step 801, an access network device sends fourth configuration information to a terminal, the fourth configuration information being used for indicating at least two frequency domain resource ranges.

The at least two frequency domain resource ranges are used to carry service data respectively, and the service data is uplink service data or downlink service data. Optionally, the service data is service data of a URLLC service.

Optionally, at least two frequency domain resource ranges are all frequency domain resource ranges that may carry URLLC services.

Optionally, the fourth configuration information is carried in any one (or at least one) of an MIB, an SIB, an RRC message, an MAC CE, and DCI.

Schematically, the access network device broadcasts an SIB, the SIB carrying fourth configuration information. The fourth configuration information is used to indicate at least two frequency domain resource ranges W that carry URLLCs. Optionally, each frequency domain resource range includes consecutive multiple PRBs, different frequency domain resource ranges are discrete, and each frequency domain resource range is identified by using an index range of the PRB.

Figure 9:
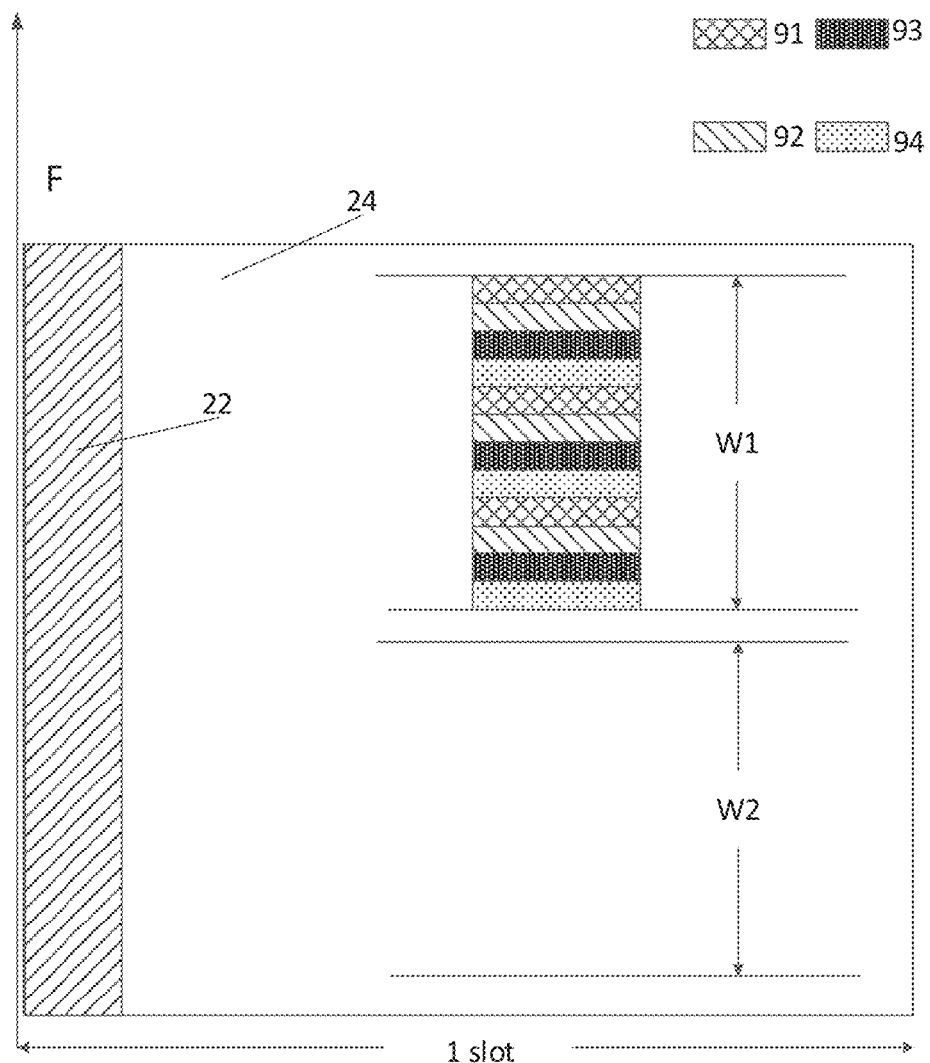
FIG. 9 is a schematic pattern diagram of K frequency domain resource patterns according to an exemplary embodiment of the present disclosure.

Referring to FIG. 9, in a typical slot, one or more symbols 22 located at the front of the slot are used to transmit a control channel of an eMBB service, and multiple symbols 24 located at the rear of the slot are used to transmit service data of the eMBB service. A frequency domain resource range W1 and a frequency domain resource range W2 in the multiple symbols 24 are used for carrying service data of a URLLC service.

At step 802, the terminal receives the fourth configuration information.

Schematically, the terminal receives the fourth configuration information in an SIB. The fourth configuration information carries PRB indexes corresponding to at least two frequency domain resource ranges W1 and W2 respectively.

At step 803, the terminal determines at least two frequency domain resource ranges according to the fourth configuration information.

Schematically, the terminal determines the frequency domain resource range W1 and the frequency domain resource range W2 according to the fourth configuration information.

At step 804, the access network device sends fifth configuration information to the terminal, the fifth configuration information being used for indicating an index of a specified frequency domain resource range occupied by K frequency domain resource patterns.

During a certain period of time, only a portion of at least two frequency domain resource ranges may be used to carry the URLLC service.

Schematically, the access network device sends fifth configuration information to the terminal, the fifth configuration information being used for indicating an index of a specified frequency domain resource range occupied by K frequency domain resource patterns. The fifth configuration information may be semi-statically configured or dynamically configured. If the fifth configuration information is semi-statically configured, frequency domain resources in the specified frequency domain resource range are used to carry the URLLC service data in a period of time between the current configuration and the next configuration.

Optionally, the fifth configuration information is carried in any one (or at least one) of an MIB, an SIB, an RRC message, an MAC CE, and DCI.

For example, the access network device sends an RRC message to the terminal, the RRC message carrying fifth configuration information, the fifth configuration information being used for indicating an index of a specified frequency domain resource range occupied by K frequency domain resource patterns.

At step 805, the terminal receives the fifth configuration information.

Schematically, the terminal receives an RRC message, where the RRC message carries the fifth configuration information. In the example shown in FIG. 9, the fifth configuration information may carry an index of the specified frequency domain resource range W1.

At step 806, the terminal determines the specified frequency domain resource range in at least two frequency domain resource ranges according to the fifth configuration information.

Schematically, the terminal determines the specified frequency domain resource range W1 in at least two frequency domain resource ranges W1 and W2. That is, the K frequency domain resource patterns occupy frequency domain resources on the specified frequency domain resource range W1.

At step 807, the access network device sends sixth configuration information to the terminal, the sixth configuration information being used for indicating to divide the specified frequency domain resource range into K groups.

Optionally, the sixth configuration information is carried in any one (or at least one) of an MIB, an SIB, an RRC message, an MAC CE, and DCI.

Schematically, the access network device sends an MAC CE message to the terminal, where the MAC CE message carries sixth configuration information. The sixth configuration information is used for indicating to divide the frequency domain resources in the frequency domain resource range W into K groups.

For example, the sixth configuration information may use two bits 11 to represent K=4; and/or, the sixth configuration information may use 1 bit to indicate that the PRBs in the K frequency domain resource patterns are discrete or consecutive. When the PRBs in the K frequency domain resource patterns are discrete, the PRBs in each frequency domain resource pattern are equally spaced, and the PRBs between different frequency domain resource patterns alternately appear. In some embodiments, the arrangement mode of the PRBs is pre-determined by a communication protocol, and the sixth configuration information is not required to be explicitly configured.

In the example shown in FIG. 9, a scenario in which K=4 and various PRBs are alternately arranged is shown, that is, a PRB of a frequency domain resource pattern 92 appears below a RRB corresponding to a frequency domain resource pattern 91. A PRB of a frequency domain resource pattern 93 appears below the RRB corresponding to the frequency domain resource pattern 92. A PRB of a frequency domain resource pattern 94 appears below the RRB corresponding to the frequency domain resource pattern 93.

At step 808, the terminal receives the sixth configuration information.

Schematically, the terminal receives an MAC CE message, where the MAC CE message carries third configuration information.

At step 809, the terminal divides the specified frequency domain resource range into K groups according to the sixth configuration information to obtain K frequency domain resource patterns.

Optionally, after determining the K frequency domain resource patterns, the terminal performs step 301 to step 304 between the access network device and the terminal.

Schematically, if the K frequency domain resource patterns are shown in FIG. 9, the access network device may use 2 bits in DCI to indicate an index of the first frequency domain resource pattern. If the value is 00, the first frequency domain resource pattern is the frequency domain resource pattern 91; if the value is 01, the first frequency domain resource pattern is the frequency domain resource pattern 92; if the value is 10, the first frequency domain resource pattern is the frequency domain resource pattern 93 and if the value is 11, the first frequency domain resource pattern is the frequency domain resource pattern 94.

Figure 10:
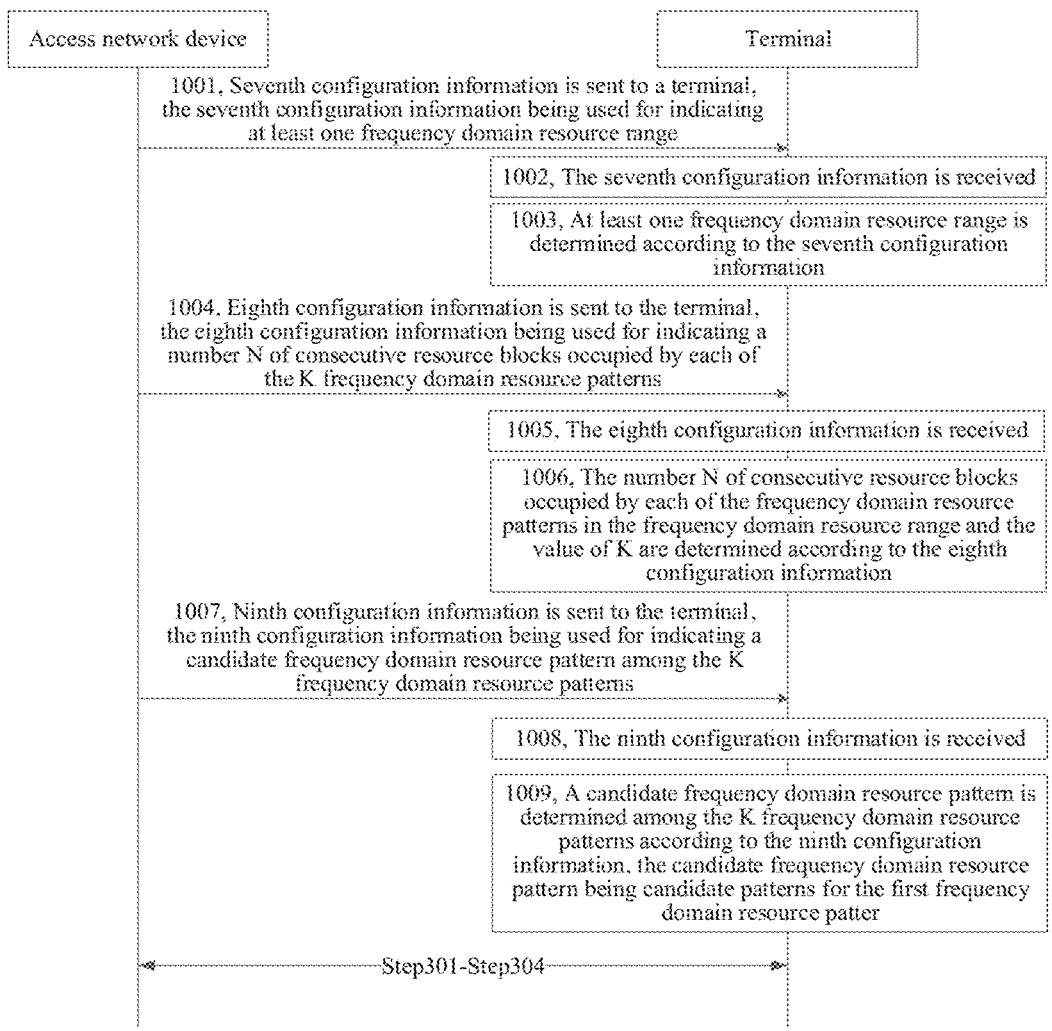
FIG. 10 is a schematic flowchart of an information sending method according to an exemplary embodiment of the present disclosure.

As another implementation manner different from FIG. 8, FIG. 10 shows a schematic flowchart of an information sending method according to an exemplary embodiment of the present disclosure. In the present embodiment, as an example of description, the access network device configures related information of K frequency domain resource patterns to the terminal through three pieces of configuration information. The method includes the following operations.

At step 1001, an access network device sends seventh configuration information to a terminal, the seventh configuration information being used for indicating at least one frequency domain resource range.

The at least one frequency domain resource range is used to carry service data respectively, and the service data is uplink service data or downlink service data. Optionally, the service data is service data of a. URLLC service.

Optionally, at least one frequency domain resource range is all frequency domain resource ranges that may carry URLLC services.

Optionally, the seventh configuration information is carried in any one (or at least one) of an MIB, an SIB, an RRC message, an MAC CE, and DCI.

Schematically, the access network device broadcasts an SIB on a Physical Broadcast Channel (PBCH), the SIB carrying seventh configuration information. The seventh configuration information is used to indicate at least two frequency domain resource ranges W that carry URLLCs. Optionally, each frequency domain resource range includes consecutive multiple PRBs, different frequency domain resource ranges are discrete, and each frequency domain resource range is identified by using an index range of the PRB.

Figure 11:
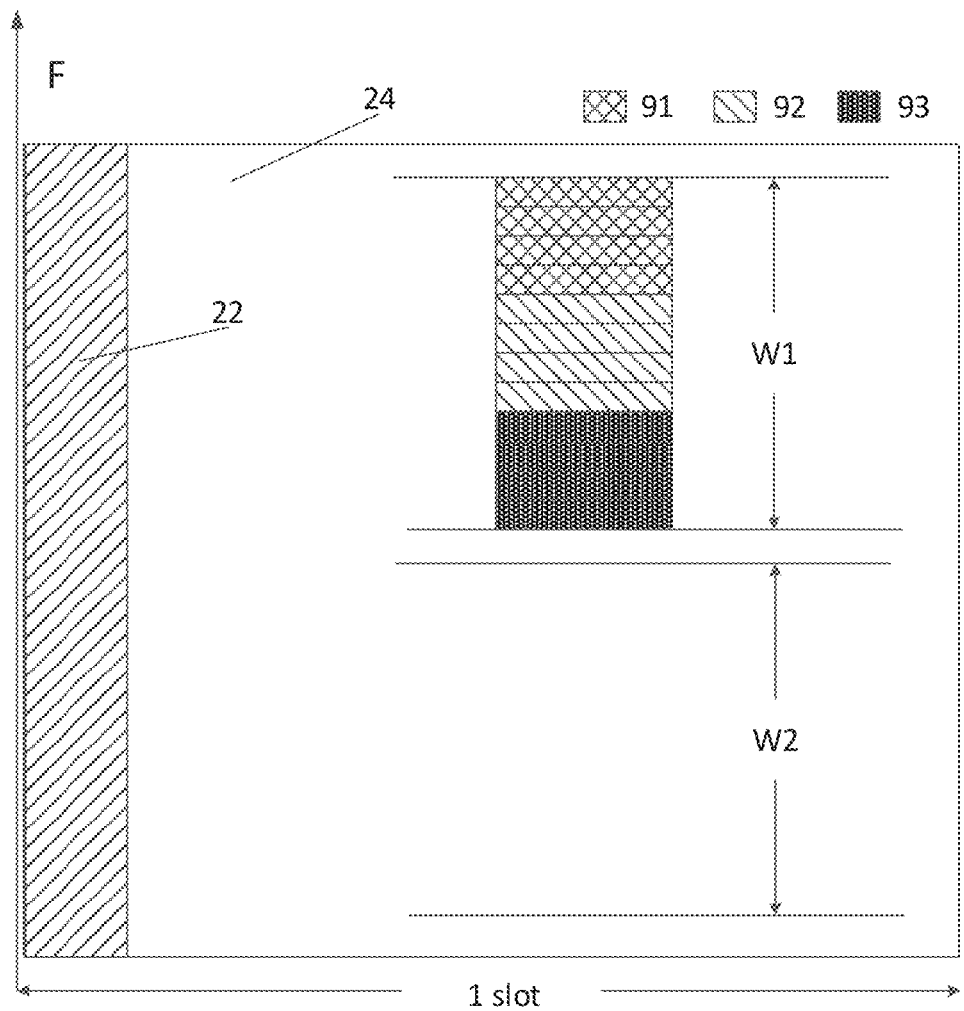
FIG. 11 is a schematic pattern diagram of K frequency domain resource patterns according to an exemplary embodiment of the present disclosure.

Referring to FIG. 11, in a typical slot, one or more symbols 22 located at the front of the slot are used to transmit a control channel of an eMBB service, and multiple symbols 24 located at the rear of the slot are used to transmit service data of the eMBB service. A frequency domain resource range W1 and a frequency domain resource range W2 in the multiple symbols 24 are used for carrying service data of a URLLC service.

At step 1002, the terminal receives the seventh configuration information.

Schematically, the terminal receives the seventh configuration information in an SIB. The seventh configuration information carries PRB indexes corresponding to at least two frequency domain resource ranges W1 and W2 respectively.

At step 1003, the terminal determines at least one frequency domain resource range according to the seventh configuration information.

Schematically, the terminal determines the frequency domain resource range W1 and the frequency domain resource range W2 according to the seventh configuration information.

At step 1004, the access network device sends eighth configuration information to the terminal, the eighth configuration information being used for indicating a number of consecutive resource blocks occupied by each of the K frequency domain resource patterns.

The number N of consecutive resource blocks occupied by each frequency domain resource pattern is configurable. The value of K may be implicitly calculated, that is. K is equal to a total number of PRBs in at least one frequency domain resource range divided by the number N of consecutive resource blocks occupied by each frequency domain resource pattern.

Schematically, the access network device sends eighth configuration information to the terminal, the eighth configuration information being used for indicating a number N of consecutive resource blocks occupied by each of the K frequency domain resource patterns. The eighth configuration information may be semi-statically configured or dynamically configured. If the eighth configuration information is semi-statically configured, the number of consecutive resource blocks occupied by each frequency domain resource pattern is N for a period of time between the current configuration and the next configuration.

Optionally, the eighth configuration information is carried in any one (or at least one) of an MIB, an SIB, an RRC message, an MAC CE, and DCI.

For example, the access network device sends an RRC message to the terminal, the RRC message carrying eighth configuration information, the eighth configuration information being used for indicating a number N of consecutive resource blocks occupied by each of the K frequency domain resource patterns.

At step 1005, the terminal receives the eighth configuration information.

Schematically, the terminal receives an RRC message, where the RRC message carries the eighth configuration information. In the example shown in FIG. 11, the eighth configuration information carries N=4, at which time K=12/4=3.

At step 1006, the terminal determines the number N of consecutive resource blocks occupied by each of the K frequency domain resource patterns and the value of K according to the eighth configuration information.

At step 1007, the access network device sends ninth configuration information to the terminal, the ninth configuration information being used for indicating a candidate frequency domain resource pattern among the K frequency domain resource patterns.

Optionally, for a certain terminal, all the patterns among the K frequency domain resource patterns cannot be used as candidate frequency domain resource patterns. The access network device sends ninth configuration information to the terminal; the ninth configuration information being used for indicating a candidate frequency domain resource pattern among the K frequency domain resource patterns. That is, among the K frequency domain resource patterns, certain frequency domain resource patterns can be used as candidate frequency domain resource patterns for the terminal.

Optionally, the ninth configuration information is carried in any one (or at least one) of an MIB, an SIB, an RRC message, an MAC CE, and DCI.

Schematically, the access network device sends an MAC CE message to the terminal, where the MAC CE message carries ninth configuration information.

For example, if the ninth configuration information is (1, 2), it is indicated that among three frequency domain resource patterns, the first frequency domain resource pattern and the second frequency domain resource pattern are candidate frequency domain resource patterns. That is, the terminal may determine the first frequency domain resource pattern and/or the second frequency domain resource pattern as the first frequency domain resource pattern according to the configuration of the access network device.

In the example shown in FIG. 11, a scene in which N=4, K=3, and respective PRBs are consecutively arranged is shown.

At step 1008, the terminal receives the ninth configuration information.

Schematically, the terminal receives an MAC CE message, where the MAC CE message carries ninth configuration information.

At step 1009, the terminal determines a candidate frequency domain resource pattern among the K frequency domain resource patterns according to the ninth configuration information, the candidate frequency domain resource pattern being candidate patterns for the first frequency domain resource pattern.

Schematically, the K frequency domain resource patterns are as shown in FIG. 11. If the ninth configuration information is (1, 2), a frequency domain resource pattern 91 and a frequency domain resource pattern 92 are candidate frequency domain resource patterns. If the ninth configuration information is (1, 3), the frequency domain resource pattern 91 and a frequency domain resource pattern 93 are candidate frequency domain resource patterns. If the ninth configuration information is (2, 3), the frequency domain resource pattern 92 and the frequency domain resource pattern 93 are candidate frequency domain resource patterns.

Optionally, after determining the K frequency domain resource patterns, the terminal performs step 301 to step 304 between the access network device and the terminal.

For example, the access network device uses 1 bit in the DCI to indicate an index of the first frequency domain resource pattern. If the value is 0, the frequency domain resource pattern 91 is determined to be the first frequency domain resource pattern. If the value is 1, the frequency domain resource pattern 92 is determined to be the second frequency domain resource pattern.

The embodiment of FIG. 6, the embodiment of FIG. 8 and the embodiment of FIG. 10 are all exemplified by the configuration information sent by the access network device to the terminal. However, in some embodiments, one or at least two pieces of configuration information may be pre-determined by a communication protocol. In this case, the corresponding sending step and receiving step in the embodiment of FIG. 6, the embodiment of FIG. 8 and the embodiment of FIG. 10 may be omitted. Specifically, if the second configuration information in the embodiment of FIG. 6 is pre-determined, by the communication protocol, step 601 and step 602 are omitted; or, if the third configuration information in the embodiment of FIG. 6 is pre-determined by the communication protocol, step 604 and step 605 are omitted.

If the fourth configuration information in the embodiment of FIG. 8 is pre-determined by the communication protocol, step 801 and step 802 are omitted; if the fifth configuration information in the embodiment of FIG. 8 is pre-determined by the communication protocol, step 804 and step 805 are omitted; or, if the sixth configuration information in the embodiment of FIG. 8 is pre-determined by the communication protocol, step 807 and step 808 are omitted.

If the seventh configuration information in the embodiment of FIG. 10 is pre-determined by the communication protocol, step 1001 and step 1002 are omitted; if the eighth configuration information in the embodiment of FIG. 10 is pre-determined by the communication protocol, step 1004 and step 1005 are omitted; communication protocol, step 1007 and step 1008 are omitted.

The embodiment of FIG. 6, the embodiment of FIG. 8 and the embodiment of FIG. 10 are all exemplified by the configuration information sent by the access network device to the terminal. However, in some embodiments, one or at least two pieces of configuration information may be obtained by the terminal by performing mapping according to a preset parameter (Hopping). The preset parameter includes at least one of:

identification information of the terminal, identification information of a cell, identification information of a beam, identification information of a predetermined signal carried on a beam, indication information of a predetermined signal carried on a beam, frequency domain information (such as a PRB index) in the transmission of the service data, and time domain information (such as a subframe number or other time domain indexes) in the transmission of the service data.

Mapping refers to the process of inputting a preset parameter into a mapping function to obtain a mapped value. Optionally, the mapping function is a hash function, where a remainder after dividing the preset parameter by X is used as a mapping value, and X is a total number of candidate solutions corresponding to the configuration information.

Schematically, it is assumed that the specified frequency domain resource range is determined in the five frequency domain resource ranges W0, W1, W2, W3, and W4, and the terminal uses a remainder after dividing a preset parameter (identification information of a beam or a hash value of the identification information of the beam) by 0.5 as an index of the specified frequency domain resource range. For example, if the remainder is 2, it is determined that the specified frequency domain resource range is W2.

When a piece of configuration information is mapped by the terminal according to the preset parameter, the corresponding sending step and receiving step in the embodiment of FIG. 6, the embodiment of FIG. 8 and the embodiment of FIG. 10 may be omitted. Specifically, if the second configuration information in the embodiment of FIG. 6 is mapped by the terminal according to the preset parameter, step 601 and step 602 are omitted; or, if the third configuration information in the embodiment of FIG. 6 is mapped by the terminal according to the preset parameter, step 604 and step 605 are omitted.

If the fourth configuration information in the embodiment of FIG. 8 is mapped by the terminal according to the preset parameter, step 801 and step 802 are omitted; if the fifth configuration information in the embodiment of FIG. 8 is mapped by the terminal according to the preset parameter, step 804 and step 805 are omitted; or, if the sixth configuration information in the embodiment of FIG. 8 is mapped by the terminal according to the preset parameter, step 807 and step 808 are omitted.

If the seventh configuration information in the embodiment of FIG. 10 is mapped by the terminal according to the preset parameter, step 1001 and step 1002 are omitted; if the eighth configuration information in the embodiment of FIG. 10 is mapped by the terminal according to the preset parameter, step 1004 and step 1005 are omitted; or, if the ninth configuration information in the embodiment of FIG. 10 is mapped by the terminal according to the preset parameter, step 1007 and step 1008 are omitted.

In these embodiments, since some pieces of configuration information are pre-determined by the communication protocol, signaling interaction between the access network device and the terminal can be saved, the configuration efficiency is improved, and the configuration time consumption is reduced.

Different from DCI directly carrying an index of a first frequency domain resource pattern in the embodiment of FIG. 3, in some embodiments, the index of the first frequency domain resource pattern may also be mapped by the terminal according to the preset parameter. At this time, step 302 and step 303 are omitted.

Schematically, in the process of determining the first frequency domain resource pattern among the K frequency domain resource patterns, the terminal uses a remainder after dividing the identification information of the terminal by K as the index of the first frequency domain resource pattern. If the remainder is 1, it is determined that the first frequency domain resource pattern is a frequency domain resource pattern with an index number 1.

Since the number of terminals may be large, the index of the first frequency domain resource pattern in the embodiment of FIG. 3 may also be mapped by the terminal according to the preset parameter and an offset value (offset), for the purpose of avoiding collision. At this time, the DCI in steps 302 and 302 carries the offset value (offset).

Schematically, in the process of determining the first frequency domain resource pattern among the K frequency domain resource patterns, the terminal uses a remainder after dividing the identification information of the terminal and the offset value by K as the index of the first frequency domain resource pattern. Or, the terminal divides the identification information of the terminal by K to obtain a remainder, and uses the stun of the reminder and the offset value as the index of the first frequency domain resource pattern.

In these embodiments, the DCI may not be sent or the DCI only needs to carry an offset, thereby further shortening the DCI size and improving the transmission reliability of the DCI.

It should be noted that, due to the foregoing configuration information and the index of the first frequency domain resource pattern, a part of the information may be pre-determined by the communication protocol, and/or a part of the information is mapped by the terminal according to the preset parameter, and/or a part of the information is configured by the access network device for the terminal by using signaling. Therefore, the foregoing optional embodiments can be freely combined by those skilled in the art to obtain other embodiments, and the embodiments are not described herein one by one. The configuration information in the various embodiments may also be referred to as division information, pattern information, description information, and the like, which is not limited by the embodiment of the present disclosure.

The following is a device embodiment of an embodiment of the present disclosure. For the parts that are not elaborated in the device embodiment, reference may be made to the technical details disclosed in the foregoing method embodiments.

Figure 12:
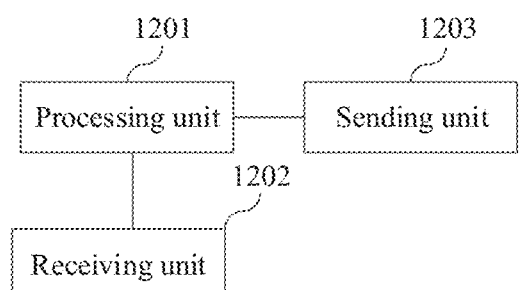
FIG. 12 is a structure block diagram of an information sending device according to another exemplary embodiment of the present disclosure.

Referring to FIG. 12, it shows a schematic stricture diagram of an information sending device according to an embodiment of the present disclosure. An uplink data device may be implemented as all or a part of an access network device by software, hardware, and a combination of both. The information sending device includes: a processing unit 1201, a receiving unit 1202 and a sending unit 1203.

The determining unit 1201 is configured to perform the above steps 301 and other functions of at least one determining step or calculating step explicit or implicit.

The receiving unit 1202 is configured to perform the function of at least one receiving step explicit or implicit in the foregoing method embodiment.

The sending unit 1203 is configured to perform the functions of step 302, step 501, step 601, step 604, step 801, step 804, step 807, step 1001, step 1004, step 1007, and other sending steps explicit or implicit.

Figure 13:
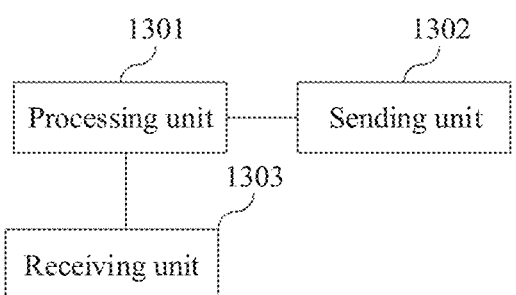
FIG. 13 is a structure block diagram of an information receiving device according to another exemplary embodiment of the present disclosure.

Referring to FIG. 13, it shows a schematic structure diagram of an information receiving device according to an embodiment of the present disclosure. The information receiving device may be implemented as all or a part of a terminal by software, hardware, and a combination of both. The information receiving device includes: a processing unit 1301, a sending unit 1302 and a receiving unit 1303.

The processing unit 1301 is configured to perform the functions of step 304, step 503, step 603, step 606, step 803, step 806, step 809, step 1003, step 1006, step 1009, and other determining or calculating steps explicit or implicit.

The sending unit 1302 is configured to perform the function of at least one sending step explicit or implicit in the foregoing method embodiment.

The receiving unit 1303 is configured to perform the functions of step 303, step 502, step 602, step 605, step 802, step 805, step 808, step 1002, step 1005, step 1008, and other receiving steps explicit or implicit.

Figure 14:
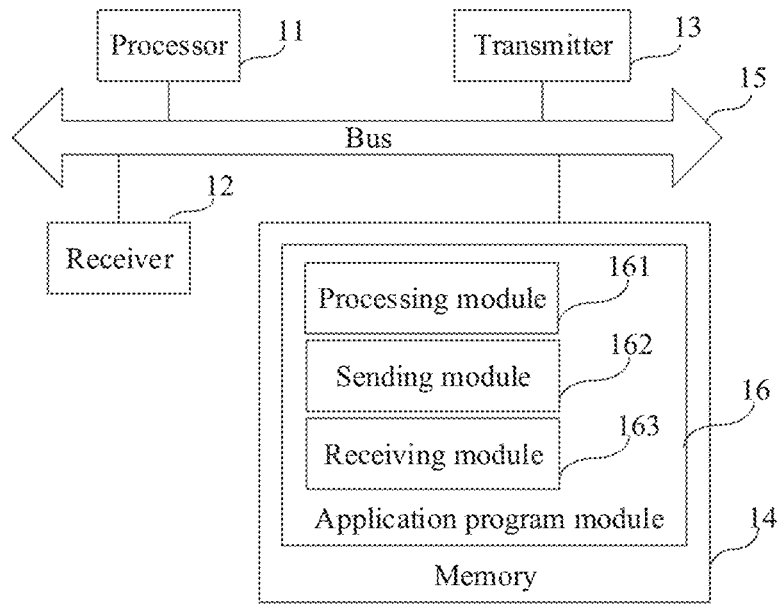
FIG. 14 is a structure block diagram of a terminal according to another exemplary embodiment of the present disclosure.

Referring to FIG. 14, it shows a schematic structure diagram of a terminal according to an exemplary embodiment of the present disclosure. The terminal includes: a processor 11, a receiver 12, a transmitter 13, a memory 14 and a bus 15.

The processor 11 includes one or more than one processing core, and the processor 11 runs software programs and modules, thereby executing various function applications and information processing.

The receiver 12 and the transmitter 13 may be implemented into a communication component. The communication component may be a communication chip. The communication chip may include a receiving module, a transmission module, a modem module and the like, and is configured to modulate and/or demodulate information and receive or send the information through a wireless signal.

The memory 14 is connected with the processor 11 through the bus 15.

The memory 14 may be configured to store the software programs and the modules.

The memory 14 may store an application program module 16 for at least one function. The application program module 16 may include a processing module 161, a receiving module 162 and a sending module 163.

The processor 11 is configured to execute the processing module 161 to realize a function of a related determining or calculating step in each method embodiment. The processor 11 is configured to execute the sending module 162 to realize a function of a related sending step in each method embodiment. The processor 11 is configured to execute the receiving module 163 to realize a function of a related receiving step in each method embodiment.

In addition, the memory 14 may be implemented by a volatile or nonvolatile storage device of any type or a combination thereof, for example, a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or an optical disk.

Figure 15:
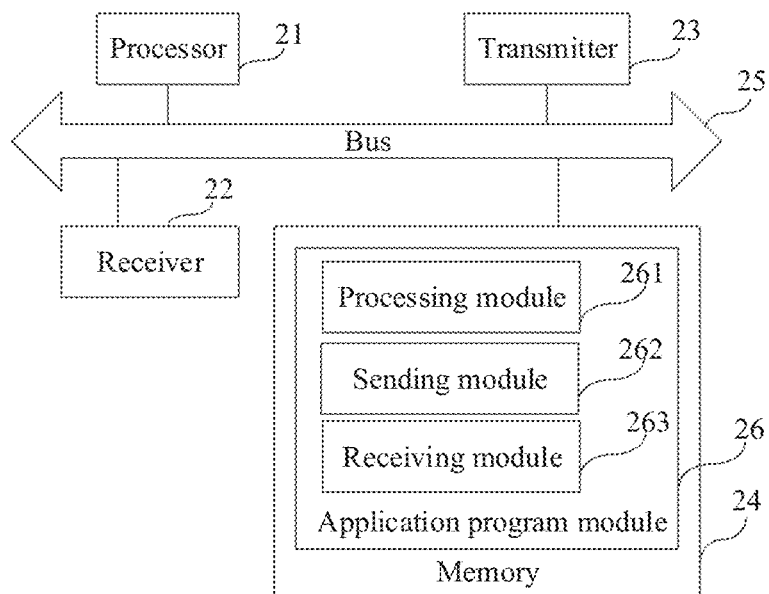
FIG. 15 is a structure block diagram of an access network device according to another exemplary embodiment of the present disclosure.

Referring to FIG. 15, it shows a schematic structure diagram of an access network device according to an exemplary embodiment of the present disclosure. The access network device includes: a processor 21, a receiver 22, a transmitter 23, a memory 24 and a bus 25.

The processor 21 includes one or more than one processing core, and the processor 21 runs software programs and modules, thereby executing various function applications and information processing.

The receiver 22 and the transmitter 23 may be implemented into a communication component. The communication component may be a communication chip. The communication chip may include a receiving module, a transmission module, a modem module and the like, and is configured to modulate and demodulate information and receive or send the information through a wireless signal.

The memory 24 is connected with the processor 21 through the bus 25.

The memory 24 may be configured to store the software programs and the modules.

The memory 24 may store an application program module 26 for at least one function. The application program module 26 may include a generation module 261, a sending module 262 and a receiving module 263.

The processor 21 is configured to execute the receiving module 263 to realize a function of a related receiving step in each method embodiment. The processor 21 is configured to execute the processing module 261 to realize a function of a related determining or calculating step in each method embodiment. The processor 21 is configured to execute the sending module 262 to realize a function of a related sending step in each method embodiment.

In addition, the memory 24 may be implemented by a volatile or nonvolatile storage device of any type or a combination thereof, for example, an SRAM, an EEPROM, an EPROM, a PROM, a ROM, a magnetic memory, a flash memory, a magnetic disk or an optical disk.

The embodiment of the present disclosure further provides an information sending system, which may include a terminal and an access network device.

The terminal may include the information receiving device provided in FIG. 13, and the access network device may be the information sending device provided in FIG. 12.

Alternatively, the terminal may be the terminal provided in FIG. 14, and the access network device may be the access network device provided in FIG. 15.

Those skilled in the art may realize that, in one or more above-mentioned examples, the functions described in the embodiments of die present disclosure may be realized through hardware, software, firmware or any combination thereof. When being realized through the software, these functions may be stored in a computer-readable medium or transmitted as one or more instructions or codes in the computer-readable medium. The computer-readable medium includes a computer storage medium and a communication medium, and the communication medium includes any medium for transmitting a computer program from one place to another place. The storage medium may be any available medium accessible for a universal or dedicated computer.

The above is only the preferred embodiment of the present disclosure and not intended to limit the present disclosure. Any modifications, equivalent replacements, improvements and the like made within the spirit and principle of the present disclosure shall fall within the scope of protection of the present disclosure.

The invention claimed is:

1. A method for information receiving, comprising:
   receiving, by a terminal, Downlink Control Information (DCI), the DCI being used for indicating an index of a first frequency domain resource pattern; and
   determining, by the terminal, the first frequency domain resource pattern among K frequency domain resource patterns according to the DCI, each frequency domain resource pattern corresponding to at least one frequency domain resource,
   the frequency domain resource corresponding to the first frequency domain resource pattern being used for transmitting service data of the terminal,
   wherein the method further comprises: before determining, by the terminal, the first frequency domain resource pattern among the K frequency domain resource patterns according to the DCI,
   receiving, by the terminal, second configuration information sent by an access network device, the second configuration information being used for indicating a frequency domain resource range, frequency domain resources in the frequency domain resource range being used for carrying the service data; and
   receiving, by the terminal, third configuration information sent by the access network device, the third configuration information being used for indicating to divide the frequency domain resources in the frequency domain resource range into K groups.

2. The method of claim 1, wherein the K frequency domain resource patterns are pre-determined.

3. The method of claim 1, wherein before determining, by the terminal, the first frequency domain resource pattern among the K frequency domain resource patterns according to the DCI, the method further comprises:
   receiving, by the terminal, first configuration information sent by the access network device, the first configuration information being used for indicating the K frequency domain resource patterns; and
   determining, by the terminal, the K frequency domain resource patterns according to the first configuration information.

4. The method of claim 3, wherein
   the first configuration information is carried in at least one of a Master Information Block (MIB), a System Information Block (SIB), a Radio Resource Control (RRC) message, a Medium Access Control (MAC) Control Element (CE), or DCI.

5. A device for information sending, comprising:
   a processor, configured to determine a first frequency domain resource pattern among K frequency domain resource patterns, each frequency domain resource pattern corresponding to at least one frequency domain resource, K being a positive integer; and
   a transceiver, configured to send Downlink Control Information (DCI) to a terminal, the DCI being used for indicating an index of the first frequency domain resource pattern, the frequency domain resource corresponding to the first frequency domain resource pattern being used for transmitting service data of the terminal,
   wherein the transceiver is configured to: before sending the DCI to the terminal,
   the transceiver is further configured to send second configuration information to the terminal, the second configuration information being used for indicating a frequency domain resource range, frequency domain resources in the frequency domain resource range being used for carrying the service data; and
   the transceiver is further configured to send third configuration information to the terminal, the third configuration information being used for indicating to divide the frequency domain resources in the frequency domain resource range into K groups.

6. The device of claim 5, wherein the K frequency domain resource patterns are pre-determined.

7. The device of claim 5, wherein
the transceiver is further configured to send first configuration information to the terminal, the first configuration information being used for indicating the K frequency domain resource patterns.

8. The device of claim 5, wherein the second configuration information is pre-determined or obtained by the terminal by performing mapping according to a preset parameter.

9. A device for information receiving, comprising:
a transceiver, configured to receive Downlink Control Information (DCI), the DCI being used for indicating an index of a first frequency domain resource pattern; and
a processor, configured to determine the first frequency domain resource pattern among K frequency domain resource patterns according to the DCI, each frequency domain resource pattern corresponding to at least one frequency domain resource,
the frequency domain resource corresponding to the first frequency domain resource pattern being used for transmitting service data of a terminal,
wherein the transceiver is further configured to: before the processor determines the first frequency domain resource pattern among the K frequency domain resource patterns according to the DCI,
receive second configuration information sent by an access network device, the second configuration information being used for indicating a frequency domain resource range, frequency domain resources in the frequency domain resource range being used for carrying the service data; and
receive third configuration information sent by the access network device, the third configuration information being used for indicating to divide the frequency domain resources in the frequency domain resource range into K groups.

10. The device of claim 9, wherein the K frequency domain resource patterns are pre-determined.

11. The device of claim 9, wherein before the processor determines the first frequency domain resource pattern among the K frequency domain resource patterns according to the DCI,
the transceiver is further configured to receive first configuration information sent by the access network device, the first configuration information being used for indicating the K frequency domain resource patterns; and
the processor is further configured to determine the K frequency domain resource patterns according to the first configuration information.

12. The device of claim 9, wherein the second configuration information is pre-determined or obtained by the terminal by performing mapping according to a preset parameter.

13. The device of claim 9, wherein the third configuration information is pre-determined, the third configuration information being used for indicating to divide frequency domain resources in the frequency domain resource range into K groups, the frequency domain resources in the frequency domain resource range being used for carrying the service data.

* * * * *